US011119068B2

(12) United States Patent
Bercovici et al.

(10) Patent No.: US 11,119,068 B2
(45) Date of Patent: Sep. 14, 2021

(54) DEVICE AND METHOD FOR ISOTACHOPHORETIC FOCUSING LARGE SAMPLE VOLUMES

(71) Applicants: TECHNION RESEARCH & DEVELOPMENT FOUNDATION LIMITED, Haifa (IL); INTERNATIONAL BUSINESS MACHINES CORPORATION, Armonk, NY (US)

(72) Inventors: Moran Bercovici, Haifa (IL); Govind Kaigala, Pfäffikon (CH); Xander Frank Van Kooten, Haifa (IL); Nadya Ostromohov, Haifa (IL); Federico Paratore, Haifa (IL)

(73) Assignees: TECHNION RESEARCH & DEVELOPMENT FOUNDATION LIMITED, Haifa (IL); INTERNATIONAL BUSINESS MACHINES CORPORATION, Armonk, NY (US)

( * ) Notice: Subject to any disclaimer, the term of this patent is extended or adjusted under 35 U.S.C. 154(b) by 241 days.

(21) Appl. No.: 16/340,181

(22) PCT Filed: Oct. 3, 2017

(86) PCT No.: PCT/IL2017/051128
§ 371 (c)(1),
(2) Date: Apr. 8, 2019

(87) PCT Pub. No.: WO2018/065985
PCT Pub. Date: Apr. 12, 2018

(65) Prior Publication Data
US 2019/0310227 A1 Oct. 10, 2019

Related U.S. Application Data

(60) Provisional application No. 62/404,814, filed on Oct. 6, 2016.

(51) Int. Cl.
*G01N 27/447* (2006.01)
*B01D 57/02* (2006.01)

(52) U.S. Cl.
CPC ....... *G01N 27/44795* (2013.01); *B01D 57/02* (2013.01); *G01N 27/447* (2013.01); *G01N 27/44791* (2013.01)

(58) Field of Classification Search
CPC .............................................. G01N 27/44791
See application file for complete search history.

(56) References Cited

U.S. PATENT DOCUMENTS 4,666,828 A  5/1987 Gusella
4,683,202 A  7/1987 Mullis
(Continued)

OTHER PUBLICATIONS

Bagha et al., "High-sensitivity detection using isotachophoresis with variable cross-section geometry," Electrophoresis 2011, 32, 563-572 (Year: 2011).*

(Continued)

*Primary Examiner* — Alexander S Noguerola
(74) *Attorney, Agent, or Firm* — The Roy Gross Law Firm, LLC; Roy Gross

(57) ABSTRACT

The present invention provides, in some embodiments, an isotachophoresis (ITP) apparatus, a kit comprising same and method of use thereof for the focusing analytes of interest from large sample volumes.

19 Claims, 16 Drawing Sheets

(56) References Cited

U.S. PATENT DOCUMENTS

| | | | |
|---|---|---|---|
| 4,801,531 A | | 1/1989 | Frossard |
| 5,192,659 A | | 3/1993 | Simons |
| 5,272,057 A | | 12/1993 | Smulson et al. |
| 5,324,413 A | | 6/1994 | Gordon |
| 6,685,810 B2 | * | 2/2004 | Noca ................ G01N 27/44704 204/450 |
| 7,150,815 B2 | * | 12/2006 | Ashmead .......... B01L 3/502707 204/601 |
| 9,939,435 B2 | * | 4/2018 | Yamamoto ....... G01N 27/44791 |
| 2006/0042948 A1 | * | 3/2006 | Santiago .......... G01N 27/44791 204/450 |
| 2009/0255601 A1 | | 10/2009 | Baeuerle et al. |
| 2011/0120867 A1 | | 5/2011 | Mishina et al. |
| 2012/0017525 A1 | | 1/2012 | Knapp et al. |
| 2012/0175258 A1 | | 7/2012 | Mariella, Jr. |
| 2013/0175170 A1 | | 7/2013 | Ivory |
| 2013/0183211 A1 | | 7/2013 | Senftleber |

OTHER PUBLICATIONS

Bottenus, et al: "10 000-fold concentration increase in proteins in a cascade microchip using anionic ITP by a 3-D numerical simulation with experimental results", Electrophoresis, (2011), vol. 32, pp. 550-562.

Marshall, et al: "An injection molded microchip for nucleic acid purification from 25 microliter samples using isotachophoresis", Journal of Chromatography A, 133, (2014), pp. 139-142.

Bahga, et al: "High-sensitivity detection using isotachophoresis with variable cross-section geometry", Electrophoresis, (2011), vol. 32, pp. 563-572.

Khurana, et al: "Sample Zone Dynamics in Peak Mode Isotachophoresis", Analytical Chemistry, (2008), vol. 80, pp. 6300-6307.

Persat, et al: "Purification of Nucleic Acids from Whole Blood Using Isotachophoresis", Analytical Chemistry, (2009), vol. 81, pp. 9507-9511.

Zehavi, et al: "Competition between Induced-Charge Electro-Osmosis and Electrothermal Effects at Low Frequencies around a Weakly Polarizable Microchannel Corner", Physical Review Applied vol. 5, 044013 (2016).

Armstrong, et al: "Separating Microbes in the Manner of Molecules. 1. Capillary Electrokinetic Approaches", Analytical Chemistry, (1999), vol. 71, pp. 5465-5469.

Schneiderheinze, et al: "High efficiency separation of microbial aggregates using capillary electrophoresis", FEMS Microbiology Letters, vol. 189, (2000), pp. 39-44.

Phung, et al: "Rapid and sensitive microbial analysis by capillary isotachophoresis with continuous electrokinetic injection under field amplified conditions", Electrophoresis, (2013), vol. 34, pp. 1657-1662.

Karsenty, et al: "Acceleration of Surface-Based Hybridization Reactions Using Isotachophoretic Focusing", Analytical Chemistry, (2014), vol. 86, pp. 3028-3036.

Paratore, et al: "Isotachophoresis-Based Surface Immunoassay", Analytical Chemistry, (2017), vol. 89, pp. 7373-7381.

Han, et al: "Increasing hybridization rate and sensitivity of DNA microarrays using isotachophoresis", Lab Chip, (2014), vol. 14, pp. 2958-2967.

International Search Report, International Application No. PCT/IL2017/051128, dated Feb. 1, 2018.

* cited by examiner

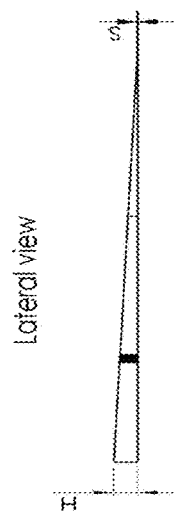
Figure 3C
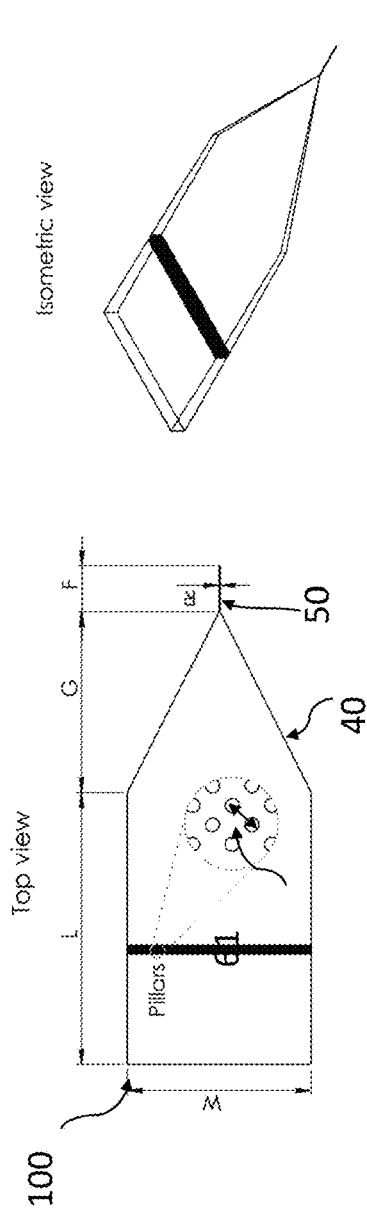
Figure 3A
Figure 3B
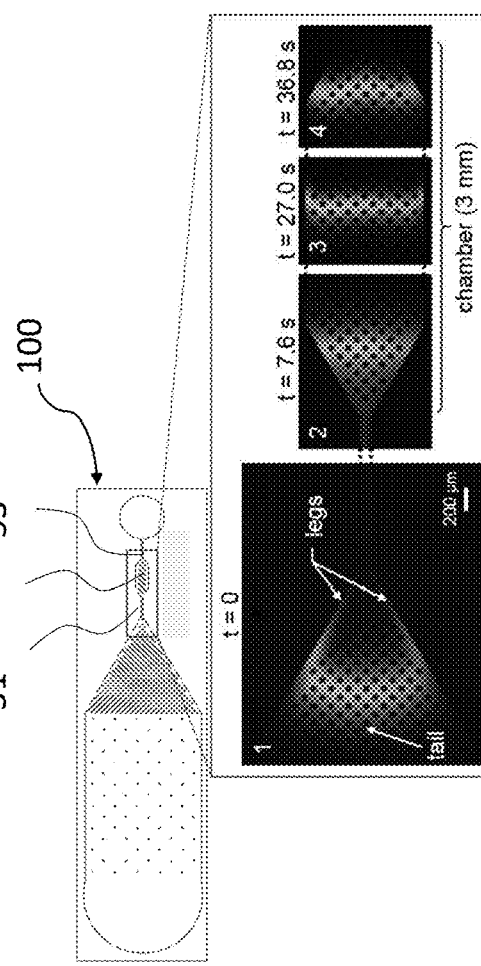
Figure 4

DEVICE AND METHOD FOR ISOTACHOPHORETIC FOCUSING LARGE SAMPLE VOLUMES

CROSS-REFERENCE TO RELATED APPLICATIONS

This application is a National Phase of PCT Patent Application No. PCT/IL2017/051128 having International filing date of Oct. 3, 2017, which claims the benefit of priority of U.S. Provisional Patent Application No. 62/404,814 filed on Oct. 6, 2016. The contents of the above applications are all incorporated by reference as if fully set forth herein in their entirety.

FIELD OF INVENTION

The present invention is directed to; inter alia, isotachophoretic systems for focusing analytes of interest from large sample volumes with high focusing ratio.

BACKGROUND OF THE INVENTION

The on-chip detection and analysis of biomarkers (such as proteins and DNA) is of critical importance for the development of point-of-care diagnostic devices as it would enable quantitative analysis using compact, low-cost devices. Such devices would enable advanced diagnosis in the developing world, as well as reduce delays in obtaining results from central laboratories and expedite treatment in the developed world. However, the low concentration at which biomolecules and pathogens typically occur in clinical samples makes their detection on chip challenging.

Isotachophoresis (ITP) is an electrophoretic technique in which one or more target analytes are focused and separated based on differences in their effective electrophoretic mobility. ITP uses a discontinuous electrolyte system, in which part of the channel is filled with leading electrolyte (LE) and the remaining part is filled with terminating electrolyte (TE) (see, FIG. 1). Typically, a background electrolyte (also termed counter-ion), is also present throughout the system to ensure that the net charge is zero. The LE and TE are chosen in such a way that their effective electrophoretic mobility is higher and lower than that of the target analytes, respectively. The sample, containing the analytes, is initially located either at the interface between the LE and TE or mixed in with one of the two.

Once an electric field is applied, all ions electromigrate at a velocity equal to the product of their electrophoretic mobility and the local electric field. The interface which was initially present between the LE and TE is maintained by the difference in electrolyte mobilities, and continuity of current implies that a steep electric field gradient is established at the interface between the two electrolytes. Analyte ions with an intermediate mobility (i.e., with a mobility bracketed by that of the LE and TE), are focused at the LE/TE interface by this electric field gradient. The focusing ratio, a commonly used metric in ITP, quantifies the ratio of final (focused) to initial concentrations.

By designing the chemistry of the LE and TE appropriately, a wide spectrum of target analytes can be selectively focused, ranging from small ionic compounds to large biomolecules such as nucleic acids. ITP has been used for a variety of biochemical processes and analyses, including purification of nucleic acids and detection of toxins in tap water.

When ITP is used as an analytical technique, i.e., for the detection of species, strong focusing is of great importance for achieving sensitive detection. The theoretical limit of the focusing ratio is given by the volume of processed sample, as ITP can only concentrate ions that are initially present in the sample. Traditional on-chip implementation in nanoliter-scale microchannels results in a limited number of target molecules available for detection, and therefore limits the overall focusing ratio. This means that in order to achieve extremely high focusing ratios, more sample must be processed using ITP. The largest on-chip sample volume reported in literature is a still relatively low 1.1 µL, with a focusing ratio of 10,000 (Bottenus, D., et al. Electrophoresis 32, 550-562, 2011).

One known approach to increasing the processed volume involves increasing the width of the channel (e.g. from 100 µm to 1 cm) while maintaining its length. This allows the voltage to remain constant, and the increase in processed volume is now due to the increased cross-sectional area. Marshall, L. A. et al. employed this approach to process 25 µL of sample (Marshall et al., *J. Chromatogr. A* 1331, 139-142, 2014). An alternative method for increasing the processed volume involves the use of longer channels, where the increased accumulation length provides both higher focusing ratios and a larger processed volume.

Although increasing the width of the channel does indeed enable a larger volume of sample to be processed, no increase in focusing ratio is achieved because the volume of the focused sample remains proportional to the cross-sectional area of the channel (i.e., the sample is focused axially, but occupies the entire width of the channel).

The second approach to increasing the processed volume, namely increasing the length of the channel, does achieve a larger processed volume and an increased focusing ratio. However, in order to achieve these higher focusing ratios, the electric field must remain constant, which in turn requires the applied voltage to be scaled up proportionally. For an increase in processed volume from the typical 100 nL to 10 µL, an increase in voltage from 1 kV to 100 kV s required. This approach is used in capillary electrophoresis machines but presents problems for point-of-care applications, for which high-voltage supplies are too expensive and bulky, or for which the use of high voltages may not be permitted.

U.S. patent application No. US 2012/0175258 provides an isotachophoresis system for separating a sample containing particles into discrete packets including a flow channel having a large diameter section and a small diameter section; a negative electrode operably connected to the flow channel; a positive electrode operably connected to the flow channel; a leading carrier fluid in the flow channel; a trailing carrier fluid in the flow channel; and a control for separating the particles in the sample into discrete packets using the leading carrier fluid, the trailing carrier fluid, the large diameter section, and the small diameter section. U.S. patent application Nos. US 20130175170 and US 20110120867 further relate to ITP systems having specific geometrical properties.

SUMMARY OF THE INVENTION

According to one aspect, there is provided an isotachophoresis (ITP) apparatus comprising:
 (a) a flow channel comprising:
  (i) a first wide cross-sectional region comprising an absolute volume of at least 10 ul, and (ii) a second narrow cross-sectional region in fluid communication to said first wide cross-sectional region, wherein the cross-sectional area ratio between the first wide cross-sectional and the second narrow cross-sectional regions is at least 10:1, wherein the first wide cross-sectional region comprises an array of inert structures so as to reduce sample dispersion by at least 1.5 fold in said first wide cross-sectional region compared to the second narrow cross-sectional region, and (b) a first zone and a second zone, said first zone is configured to contain a solution of high effective mobility leading electrolyte (LE) ion, and said second zone is configured to contain a solution of low effective mobility trailing electrolyte (TE) ion.

According to some embodiments, the first wide cross-sectional region comprises a converging cross-sectional region in fluid continuation between the first wide cross-sectional and the second narrow cross-sectional region.

According to some embodiments, said array of inert structures is a plurality of pillars having a diameter in the range of 5-200 μm. In some embodiments, said array of inert structures is a plurality of pillars having a diameter in the range of 20-100 μm. According to some embodiments, said plurality of pillars is pillar arrays having a center-to-center distance of 10-800 μm. According to some embodiments, said plurality of pillars is pillar arrays having a center-to-center distance of 50-300 μm. According to some embodiments, said plurality of pillars is characterized by a ratio of at least 1:2 between the pillar diameter to pillar center-to-center. According to some embodiments, the center-to-center distance of each pillar of the pillar array within the converging cross-sectional region is from 0 down to 5 fold lower than that of the non-converging cross-sectional region of said first wide cross-sectional region. According to some embodiments, the center-to-center distance of each pillar of the pillar array within the converging cross-sectional region is lower by 1.5-5 fold than that of the non-converging cross-sectional region of said first wide cross-sectional region. According to some embodiments, the center-to-center distance of each pillar of the pillar array within the converging cross-sectional region is identical to that of the non-converging cross-sectional region of said first wide cross-sectional region.

According to some embodiments, said array of inert structure within the first wide cross-sectional region form a plurality of flow channels.

According to some embodiments, said second narrow cross-sectional region has a width and a height in the range of 1-100 μm.

According to some embodiments, said converging cross-sectional region has an angle of 10-70 degrees. According to some embodiments, said converging cross-sectional region has an angle of 20-50 degrees.

According to some embodiments, at least a portion of the first wide cross-sectional region has a uniform depth. According to some embodiments, at least a portion of the first wide cross-sectional region has converging depth, said depth ratio between the first and second cross-sectional regions is in the range of 1000:1.1. According to some embodiments, at least a portion of the first wide cross-sectional region has a depth ranging from 10 mm to 100 μm and the second narrow cross-sectional region has a depth ranging from 100 μm to 10 μm.

According to some embodiments, the second narrow cross-section region comprises:

(i) a first narrow cross-sectional subzone,
(ii) a second wide cross-sectional subzone, and
(iii) a third narrow cross-sectional subzone,
wherein the ratio between the width of first and third wide cross-sectional subzones and the width of second narrow cross-sectional subzone is in between 10:1-5:1.

According to some embodiments, at least a portion of the second wide cross-sectional subzone comprises an array of inert structures. According to some embodiments, the array of inert structures is a plurality of pillars having a diameter in the range of 20-100 μm. According to some embodiments, the array of inert structures is a plurality of pillars having a diameter in the range of 50-300 μm. According to some embodiments, the center-to-center distance of each pillar of the pillar array within said second wide cross-sectional subzone is from 0 up to 5 fold higher than that of said converging cross-sectional region.

According to some embodiments, the apparatus of the present invention further comprising at least one cooling channel in parallel and/or proximity to at least a portion of the second narrow cross-sectional region.

According to some embodiments, said flow channel is configured to be operably connected to at least one anode and at least one cathode.

According to another aspect, there is provided an ITP method, comprising the steps of:

(a) providing the ITP apparatus disclosed herein;
(b) providing a sample to the flow channel of said ITP apparatus; and
(c) applying an electric field across said first zone and said second zone.

According to some embodiments, the method disclosed herein is for focusing analytes from large sample volumes. According to some embodiments, the method disclosed herein has at least 100-fold enhancement in any one of signal and limit of detection compared to a control microchannel. According to some embodiments, the method is characterized by ITP focusing of target analytes from initial sample volumes of 80-10 μL into a concentrated zone with a volume of 800-300 pL.

According to another aspect, there is provided a kit comprising:

(i) the ITP apparatus disclosed herein;
(ii) a solution of high effective mobility leading electrolyte (LE) ion; and
(iii) a solution of low effective mobility trailing electrolyte (TE) ion.

According to some embodiments, the kit disclosed herein is for focusing an analyte of interest from large sample volumes.

According to some embodiments, the LE and TE solutions have respectively higher and lower electrophoretic mobility than the analyte of interest.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 3A-C present a non-limiting schematic sketch of a top (3A), isometric (3B) and lateral (3C) view of the large-volume ITP device with pillars and a reduced cross-section in two dimensions (width and depth). The pillars are depicted in only a small part of the channel for simplicity, and may be present throughout the entire wide and converging channel.

FIG. 4 presents a non-limiting two-dimensional schematic of the ITP device having a chamber geometry in the narrow flow channel, such as for eliminating dispersion. The enlarged area shows results of ITP focusing of a fluorescent tracer, in which the 'legs' leading into the first convergence are slowed down, allowing the ITP interface to enter the second convergence uniformly.

DETAILED DESCRIPTION OF THE INVENTION

The present invention provides, in some embodiments, an apparatus for use in electrophoresis assays such as isotachophoresis (ITP), a kit comprising same and method of use thereof for the focusing, detection or separation of analytes of interest form large sample volumes.

The present invention is based, in part, on the finding of specific geometrical properties of an ITP chip, as detailed herein below, enabling extreme focusing from extremely large volumes (e.g., up to 1 mL).

Figure 1:
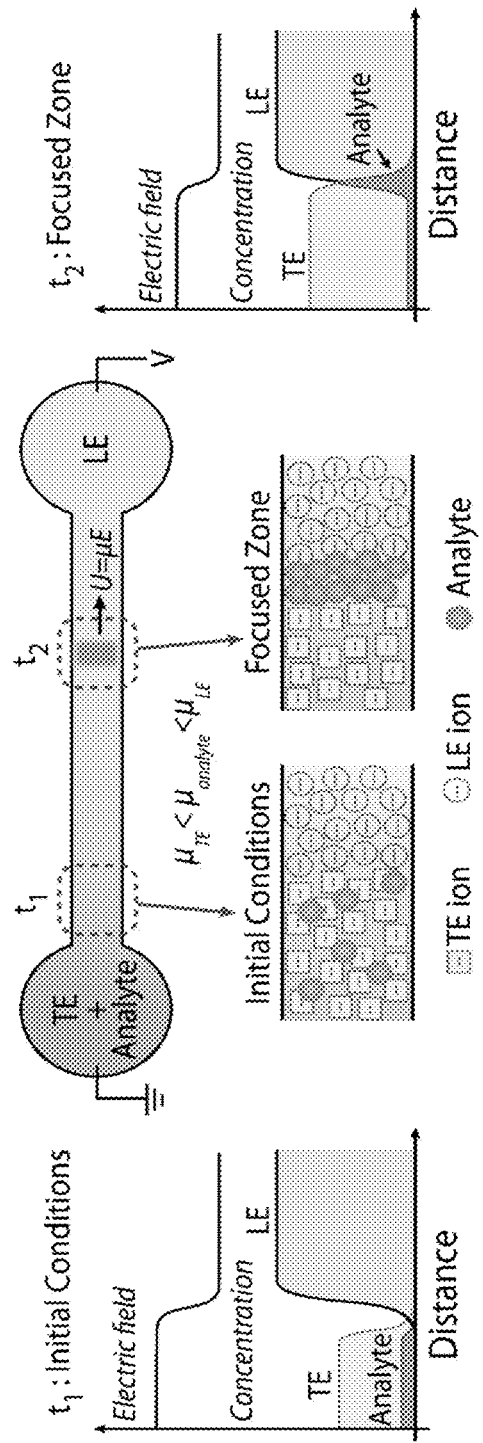
FIG. 1 presents a scheme of a typical ITP assay with a single analyte species.

The term "micro-channel" or "flow-channel" is used herein to refer to the flow path extending from at least one reservoir to at least a second reservoir. A schematic illustration of a typical flow channel connected to two reservoirs is illustrated herein in FIG. 1. A microchannel with two reservoirs is initially filled with LE (time $t_1$). The sample is mixed with the TE in the reservoir or can be injected at the TE/LE interface. Under an applied electric field, all ions electromigrate in the channel. As the mobility of the analyte lies between that of the TE and LE, it is focused at the sharp TE/LE interface (time $t_2$).

As used herein, the term "fluid" includes both gases and liquids, preferably the latter. The fluid may be an aqueous solution or suspension containing particles (e.g., cells, microorganisms, ions, small and large molecules, such as proteins and nucleic acids, etc.) In a particular use, the fluid may be a bodily fluid, such as blood, urine, and saliva.

As used herein, the term "chip" refers to down-scaling the laboratory to one single and very small element compared with a laboratory in traditional sense. The chip disclosed herein (also termed "apparatus") is substantially planner, and has an overall size of the in the cm regime.

Figure 2:
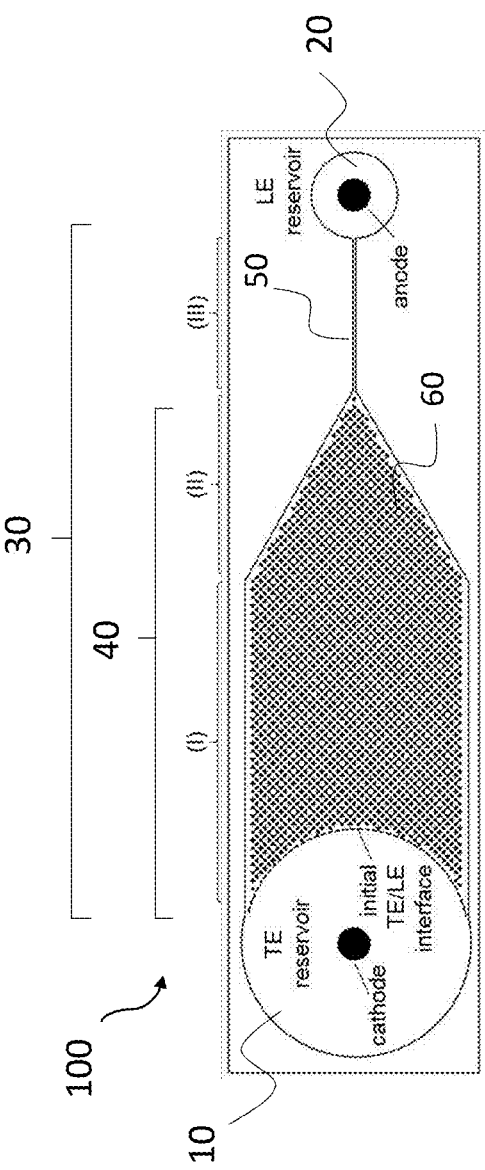
FIG. 2 presents a non-limiting two-dimensional schematic of the wide ITP channel (I) with a convergence (II) leading to a narrow channel (III). The cathode and anode are placed in the TE and LE reservoirs, respectively, for anionic ITP. The array of pillars in the wide and converging channel is shown as black dots.

Reference is now made to FIG. 2, which show a perspective view of an exemplary apparatus 100.

Apparatus 100 may have a first zone 10 and a second zone 20, said first zone is configured to contain a solution of high effective mobility leading electrolyte (LE) ion, and said second zone is configured to contain a solution of low effective mobility trailing electrolyte (TE) ion Apparatus 100 may comprise one or more flow channels 30 elongated and in fluid communication from said first zone 10 and a second zone 20. Flow channel 30 may comprise a first wide cross-sectional region 40 (region I and II) and a second narrow cross-sectional region 50.

The first wide cross-sectional region 40 and the second narrow cross-sectional region 50 may have a cross-sectional area ratio between of at least 10:1. Reference is now made to FIG. 3A, which show a perspective view of the flow channel of an exemplary apparatus 100, wherein W is the cross-sectional width of the first wide cross-sectional region 40 and R is the width of the second narrow cross-sectional region 50.

It is understood that first zone 10, flow channel 30 and second zone 20 are in fluid communication. It is understood that first wide cross-sectional region 40 and the second narrow cross-sectional region 50 are in fluid communication.

In some embodiments, the first wide cross-sectional region 40 comprises a converging cross-sectional region (40-II) in fluid continuation between the first wide cross-sectional (40-I) and the second narrow cross-sectional region 50. The converging cross-sectional region may have an angle of at least 10, at least 20 or at least 30 degrees, and/or at most 50, at most 60 or at most 70 degrees along a longitude axial of the flow channel.

Advantageously, the ITP apparatus of the invention is particularly useful for focusing analytes from large sample. Optionally, said first wide cross-sectional region comprises an absolute volume of at least 10 ul, at least 15 ul, at least 20 ul, at least 30 ul, at least 40 ul, at least 50 ul, at least 100 ul. As disclosed herein, the ITP apparatus of the invention provides focusing of extremely large volumes, such as even at the scale of 1 mL.

The first wide cross-sectional region 40 may comprise an array of inert structures 60. The term "inert" as used herein refers to structures having little or no ability to react with the sample, by chemical or biological means. The array of inert structures 60 may be configured to reduce sample dispersion by at least 1.5 fold, at least 2 fold, at least 2.5 fold, at least 3 fold, at least 4 fold, or at least 5 fold in said first wide cross-sectional region compared to the second narrow cross-sectional region.

The array of inert structures 60 may be adapted or configured to provide hydrodynamic resistance to fluids flowing through the flow channel. Optionally, the array of inert structures 60 provides a hydrodynamic resistance of at least 1.5 fold in said first wide cross-sectional region compared to the second narrow cross-sectional region.

The array of inert structures may be in a form of a plurality of pillars. Each pillar of the plurality of pillars may, independently, have a diameter in the range of 5-200 µm. Optionally, each pillar of the plurality of pillars may, independently, have a diameter in the range of 20-100 µm. The inert structures (e.g., pillars) or at least a portion thereof, may have a height elongated from the bottom of the flow channel to the top wall of the flow channel or at least the determined height of the fluid flowing through the channel. The pillars may be molded into the bottom of the flow channel or they could be adhesively bonded thereto. The inert structures (e.g., pillars) may be of any shape including, but not limited to, cylindrical.

Reference is now made to FIG. 3A, depicting as a non-limiting example a pillar center-to-center as 61. The plurality of pillars may be characterized as pillar arrays having a pillar center-to-center distance of at least 10 μm. The plurality of pillars may be characterized as pillar arrays having a pillar center-to-center distance of at least 25 μm. The plurality of pillars may be characterized as pillar arrays having a pillar center-to-center distance of at least 50 μm. The plurality of pillars may be characterized as pillar arrays having a pillar center-to-center distance of at most 800 μm. The plurality of pillars may be characterized as pillar arrays having a pillar center-to-center distance of at most 150 μm, at most 175 μm, at most 200 μm, at most 250 μm or at most 300 μm. The plurality of pillars may be characterized by a ratio of at least 1:2 between the pillar diameter to pillar center-to-center.

The center-to-center distance of each pillar of the pillar array within the converging cross-sectional region 40-II may be characterized by the range of being lower by at most 5 fold to higher by at most 5 fold than that of the non-converging cross-sectional region 40-I of said first wide cross-sectional region. The center-to-center distance of each pillar of the pillar array within the converging cross-sectional region 40-II may be lower by at least 1.5 fold than that of the non-converging cross-sectional region 40-I of said first wide cross-sectional region. The center-to-center distance of each pillar of the pillar array within the converging cross-sectional region 40-II may be lower by at most 5 fold than that of the non-converging cross-sectional region 40-I of said first wide cross-sectional region. The center-to-center distance of each pillar of the pillar array within the converging cross-sectional region may be substantially identical to that of the non-converging cross-sectional region of the first wide cross-sectional region.

The pillars may form a contact angle of at least 30 degrees, or at least 40 degrees or at least 50 or at least 60 or at least 70 or at least 80 degrees to a fluid flowing along the flow channel.

One of skill in the art can determine the material suitable for forming the inert structures of the invention. The inert structures may be formed by the same material of the chip. As a non-limiting example, the inert structures may be polymer-based such as by a polymer material selected from polypropylene, polyethylene, poly(dimethylsiloxane) (PDMS) and amorphous polymer cyclic olefin copolymer materials. Alternatively, other substance including ceramic, silicon, or other materials may be selected for structural rigidity suitable for ITP.

Optionally, the contact angle may be in the range of 35-45 degrees to a fluid containing human DNA. Optionally, in case where the fluid is water, the contact angle may be above 90 degrees.

Reference is now made to FIG. 3B depicting as a non-limiting example apparatus 100 wherein said array of inert structure within the first wide cross-sectional region form a plurality of flow channels.

The second narrow cross-sectional region 50 of flow channel 30 may have the dimensions common for ITP channels, such as a width and a height in the range of 1-100 μm.

Flow channel 30 may have a uniform depth along the first wide cross-sectional region 40 and the second narrow cross-sectional region 50. Alternatively, at least a portion of flow channel 30 may have a converging depth. Reference is now made to FIGS. 3B-C, depicting as a non-limiting example apparatus 100, having a flow channel with a converging depth. Optionally, the depth ratio between the first and second cross-sectional regions is in the range of 1000:1.1. Optionally, the first wide cross-sectional region 40 has a depth H ranging from 10 mm to 100 μm and the second narrow cross-sectional region 50 has a depth S ranging from 100 μm to 10 μm.

Reference is now made to FIG. 4, depicting as a non-limiting example apparatus 100, wherein the second narrow cross-section region comprises a first narrow cross-sectional subzone 51, a second wide cross-sectional subzone 52, and a third narrow cross-sectional subzone 53. The ratio between the width of first and third wide cross-sectional subzones and the width of second narrow cross-sectional subzone is optionally between 10:1-5:1. Optionally, the cross-sectional width connecting subzones 51, 52 and 53, may be converging, such as at 10-80 degrees along the longitude axial of the flow channel.

The second wide cross-sectional subzone 52 may comprise an array of inert structures, such as an array of pillars as described herein for the first wide cross-sectional region 40.

The center-to-center distance of each pillar of the pillar array within the second wide cross-sectional subzone 52 may be characterized by the range of being lower by at most 5 fold to higher by at most 5 fold than that of the converging cross-sectional region 40-II. The center-to-center distance of each pillar of the pillar array within the second wide cross-sectional subzone 52 may be higher by at least 1.5 fold than that of the converging cross-sectional region 40-II. The center-to-center distance of each pillar of the pillar array within the second wide cross-sectional subzone 52 may be higher by at most 5 fold than that of the converging cross-sectional region 40-II. The center-to-center distance of each pillar of the pillar array within second wide cross-sectional subzone 52 may be identical to that of converging cross-sectional region 40-II.

Optionally, the length and width of first wide cross-sectional region are in the range of 0.5-3 cm and 0.4-2 cm. Optionally, the length and width of second narrow cross-sectional region are in the range of 0.5-5 cm and 0.05-5 mm.

Optionally, the ratio of center-to-center distance of each pillar between first wide region and second wide subzone is in the range of 10:1-1:10. Optionally, the ratio of center-to-center distance of each pillar between first wide region and second wide subzone is substantially equal. Optionally, the pillars array angle with respect to the electric field is in the range of 0-89°. Optionally, the pillars array angle with respect to the electric field is in the range of 20-60°. Optionally, the pillars array angle with respect to the electric field is in the range of 40-50°. Optionally, the pillars array angle with respect to the electric field is 45°. As exemplified herein, superior uniformity yield was demonstrated using a pillar diameter of D=50 μm and pitch (P) of 100 μm) as opposed to larger pillars with larger pitch (D=100 μm, P=200 μm), under identical pillar array angle and applied electric field.

Optionally, apparatus 100 further comprises a cooling channel in parallel to at least a portion of the flow channel (e.g., at the interface of regions 40 and 50), and in proximity to at least a portion of the second narrow cross-sectional region. As used herein, the term "in proximity" refers to less than 10 μm, less than 5 μm or less than 1 μm. Optionally, apparatus 100 is attached to a glass surface to promote cooling. Optionally, apparatus 100 is attached to a paltier unit to promote cooling.

In some embodiments, the flow channel is configured to be operably connected to at least one anode and at least one cathode. In another embodiment, the leading electrolyte (LE) buffer is chosen such that its ions (cations or anions) have higher effective electrophoretic mobility than the ions of the trailing electrolyte (TE) buffer (also referred to as terminating electrolyte buffer (i.e., effective mobility describes the observable drift velocity of an ion under an electric field and takes into account the ionization state of the ion).

In some embodiments, the concentration of LE is reduced, such as by one order of magnitude so as to suppressed formation of bubbles in light of Joule heating in the narrow channel due to high current densities. As a non-limiting example, concentration of LE may be reduced from a 200 mM bistris and 100 mM HCl formulation to 20 mM bistris and 10 mM HCl. As demonstrated herein below, reduction of LE concentration resulted in reducing the conductivity from $\sigma_L E=0.835$ S/m to $\sigma_{LE}=0.094$ S/m. Alternatively, reduction of the electric field may be performed.

In another embodiment, sample ions of intermediate effective mobility race ahead of TE ions but cannot overtake LE ions, and so they focus at the LE-TE interface (hereinafter called the "ITP interface"). In another embodiment, the LE and TE buffers are chosen such that the sample ions have a higher mobility than the TE, but cannot overspeed the LE. In another embodiment, the TE and LE buffers form regions of respectively low and high conductivity, which establish a steep electric field gradient at the ITP interface. In another embodiment, the LE buffer (or LE) has a high ionic strength. In another embodiment, the LE buffer (or LE) has a low ionic strength.

In another embodiment, ITP includes a microchannel connected to two reservoirs and is initially filled with LE solution. In another embodiment, a sample comprising an analyte to be detected is mixed in the trailing electrolyte (TE) reservoir. In another embodiment, a sample comprising an analyte to be detected is mixed in the leading electrolyte (LE) reservoir. In another embodiment, a sample comprising an analyte to be detected is injected between the LE and TE. In another embodiment, an electric field induces the electromigration of all ions in the channel.

Applications

According to some embodiments, there is provided a method of ITP, the method comprising the steps of:
(a) providing the ITP apparatus of disclosed herein;
(b) providing a sample to the flow channel of said ITP apparatus; and
(c) applying an electric field across said first zone and said second zone.

According to some embodiments, there is provided a method of ITP focusing analytes from large sample volumes. According to some embodiments, there is provided a method of ITP having at least 100-fold enhancement in signal and limit of detection compared to a control microchannel.

In another embodiment, the method enables ITP focusing of target analytes from initial sample volumes of 80-10 μL into a concentrated zone with a volume of 800-300 pL (picoliter). In another embodiment, the method enables ITP focusing of target analytes from initial sample volumes of 60-40 μL into a concentrated zone with a volume of 600-400 pL. In another embodiment, the method enables ITP focusing of target analytes from initial sample volumes of 50 μL into a concentrated zone with a volume of 500 pL.

In another embodiment, the ITP device and method disclosed herein yields a 50,000-150,000-fold increase in mean concentration of target analyte. In another embodiment, the ITP device and method disclosed herein yields a 80,000-120,000-fold increase in mean concentration of target analyte. In another embodiment, the ITP device and method disclosed herein yields a 100,000-fold increase in mean concentration of target analyte.

In another embodiment, the ITP device and method disclosed herein yields a 200,000-400,000-fold increase in peak concentration of target analyte. In another embodiment, the ITP device and method disclosed herein yields a 250,000-350,000-fold increase in peak concentration of target analyte. In another embodiment, the ITP device and method disclosed herein yields a 300,000-fold increase in peak concentration of target analyte.

In another embodiment, said ITP method described herein is useful for diagnostic use. Non-limiting examples of diagnostic use include detection of pathogens such as in bodily fluids, water and food. None limiting examples of biomarkers include nucleic acids (e.g. 16S rRNA as a marker for bacteria) and proteins (e.g. HRPII as a marker for Malaria *Plasmodium falciparum*), depending on the mature of the analyte.

In another embodiment, said ITP method described herein is useful for genetic analysis, such as, detection of low concentration nucleic acid sequences in a sample.

In another embodiment, the method described herein is used for detecting a disease or disorder in a subject (e.g., a mammal and particularly human subject). It will be apparent to one skilled in the art than many disease-specific biomarkers (e.g., human miRNA) are known and can be used in the methods described herein. None limiting examples include prostate-specific membrane antigen (PSMA) for detection of prostate cancer and cTnI (cardiac trophonin I) for detection of cardiac damage. In another embodiment, the method described herein is used for detection of antibiotic resistance (e.g., by determining bacterial DNA). In another embodiment, the method described herein is used for detection of specific bacterial strains (e.g., by determining bacterial DNA).

In another embodiment, said ITP system, apparatus, kit and method described herein is useful for laboratory assays, such as in the fields of food safety (e.g., for the detection of pathogens and toxins in food products and other contaminated samples); environmental monitoring (e.g., detection of toxins in water and soil); chemical analysis (e.g., purification of analytes prior to small-scale reaction).

In another embodiment, said ITP system, apparatus, kit and method described herein is useful for acceleration of reaction kinetics between reacting species (e.g., DNA probe and nucleic acid target or antibody with antigen).

In another embodiment, the term "detecting" includes labeling, separating, enriching, identifying, sorting, isolating, or any combination thereof. In another embodiment, detecting is quantitative, qualitative, or both.

In another embodiment, the present invention provides the ITP kit as described herein and specific instructions for performing the method as described herein. In another embodiment, the present invention provides a kit comprising an instruction manual describing the method and/or system disclosed herein. In another embodiment, the present invention provides a kit as described herein further comprising an electrophoresis apparatus. In another embodiment, the present invention provides a kit as described herein further comprising an electrophoresis apparatus that is communicatively coupled to a central processing unit (including but not limited to CPU, microprocessor, ASIC or FPGA) that may operate the electrophoresis apparatus based on a predetermined set of instructions.

In another embodiment, the present invention provides methods, systems and kits that reduce false positive or false negative results. In another embodiment, the present invention provides methods, systems and kits that reduce background noise. In another embodiment, the present invention provides methods, systems and kits that provide accurate quantitative measurements of analtyes of interest. In another embodiment, the present invention provides methods, systems and kits that provide an efficient separating technique for an analyte of interest.

In another embodiment, the present method requires minimal or no sample preparation. In another embodiment, the theory behind ITP is provided in Bahga S S, Kaigala G V, Bercovici M, Santiago J G. High-sensitivity detection using isotachophoresis with variable cross-section geometry. Electrophoresis. 2011 February; 32(5):563-72; Khurana T K, Santiago J G. Sample zone dynamics in peak mode isotachophoresis. Anal Chem. 2008 Aug. 15; 80(16): 6300-7; and Isotachophoresis: Theory, Instrumentation and Applications. F. M. Everaerts, J. L. Beckers, T. P. E. M. Verheggen, Elsevier, Sep. 22, 2011, which are hereby incorporated by reference in their entirety.

In some embodiments, the ITP chip of the invention is disposable. As used herein the term "disposable" refers to a design of an apparatus such that it is intended for use for a finite number of times and then discarded. Some disposable apparatuses are used only once and then discarded, such as for diagnostic uses. Other disposable components are used more than once and then discarded.

In some embodiments, the ITP system or kit disclosed herein comprises a (disposable or permanent) ITP apparatus, a measurement apparatus configured to interact with said ITP apparatus, and a control unit configured to modulate an ITP interface of said ITP apparatus in response to a significant electric current or voltage change. In some embodiments, said measurement apparatus is configured to detect electric current and/or voltage changes (e.g., a rapid current drop). In some embodiments, said detection is performed using cross-correlation between a step function and the electric current or voltage measurement. The exact shape of the step function may be determined from preliminary experiments performed on the same geometry.

In some embodiments, the ITP apparatus, kit, system and method described herein comprise applying constant voltage and detecting current changes. In other embodiments, the ITP apparatus, kit, system and method described herein comprise applying constant current and detecting voltage changes.

In some embodiments, the correlation between the step function and the electric current/voltage signal is maximal at times where the shape of the current/voltage curve is most similar to step function. Local maxima in the cross-correlation signal may be detected, indicating passage through the constriction. A decision is then made and communicated (e.g. command to the power supply to turn off).

In another embodiment, at least two constrictions are used, wherein the first constriction is used as a learning step to construct the step function, which is then applied for detection of additional constrictions.

In another embodiment, the rate of the current/voltage changes (e.g., current decrease or voltage increase) in a straight channel (e.g. beginning of the channel) together with knowledge of the geometry is used to construct the step function.

In another embodiment, the change in current/voltage rate is detected by continuously calculating the local derivative of the current/voltage with respect to time. In another embodiment, the change in current/voltage rate is detected by continuously fitting a finite length of the electric current/voltage signal with a linear function.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Generally, the nomenclature used herein and the laboratory procedures utilized in the present invention include molecular, biochemical, microbiological and recombinant DNA techniques. Such techniques are thoroughly explained in the literature. See, for example, "Molecular Cloning: A laboratory Manual" Sambrook et al., (1989); "Current Protocols in Molecular Biology" Volumes I-III Ausubel, R. M., ed. (1994); Ausubel et al., "Current Protocols in Molecular Biology", John Wiley and Sons, Baltimore, Md. (1989); Perbal, "A Practical Guide to Molecular Cloning", John Wiley & Sons, New York (1988); Watson et al., "Recombinant DNA", Scientific American Books, New York; Birren et al. (eds) "Genome Analysis: A Laboratory Manual Series", Vols. 1-4, Cold Spring Harbor Laboratory Press, New York (1998); methodologies as set forth in U.S. Pat. Nos. 4,666,828; 4,683,202; 4,801,531; 5,192,659 and 5,272, 057; "Cell Biology: A Laboratory Handbook", Volumes I-III Cellis, J. E., ed. (1994); "Culture of Animal Cells—A Manual of Basic Technique" by Freshney, Wiley-Liss, N. Y. (1994), Third Edition; "Current Protocols in Immunology" Volumes I-III Coligan J. E., ed. (1994); Stites et al. (eds), "Basic and Clinical Immunology" (8th Edition), Appleton & Lange, Norwalk, Conn. (1994); Mishell and Shiigi (eds), "Strategies for Protein Purification and Characterization—A Laboratory Course Manual" CSHL Press (1996); all of which are incorporated by reference. Other general references are provided throughout this document.

Example 1

Device fabrication: All ITP experiments were performed either on the LVF chip disclosed herein or in 'standard' glass microchannels (NS-95x, Caliper, Waltham, Mass.), as indicated in each figure. For the fabrication of the LVF chips, a silicon wafer was patterned (Si-Mat, Kaufering, Germany) using conventional photolithography, before etching the exposed area using a Bosch process. The resist was then stripped and the wafer was vapor-coated with trichloro(1H, 1H,2H,2H-perfluorooctyl)silane (Sigma Aldrich, St. Louis, Mo.) in a desiccator and cast Sylgard 184 polydimethylsiloxane (PDMS, Dow Corning, Midland, Mich.) in a 10:1 ratio of base to crosslinker onto the wafer. After leaving the PDMS to cure for 2 hours at 80° C., it was peeled off the wafer, and holes were punched for the cathode (8 mm diameter) and anode (4 mm diameter) reservoirs. Finally, the molded PDMS surface was treated and a glass slide with oxygen plasma (30 s, 100 W) to irreversibly bond the two together.

Assay Protocols

Focusing experiments: the entire channel was filled with leading electrolyte (LE) consisting of 100 mM HCl (Merck, Darmstadt, Germany), 200 mM bistris and 1% w/v polyvinylpyrrolidone (PVP, Sigma Aldrich, St. Louis, Mo.; MW=1.3 MDa). Cy3-labeled 15-nt ssDNA (Sigma Aldrich, St. Louis, Mo.) were applied directly into terminating electrolyte (TE) consisting of 10 mM tricine (Sigma Aldrich, St. Louis, Mo.) and 20 mM bistris (Sigma Aldrich, St. Louis, Mo.) and mixed by brief vortexing. The cathode reservoir was rinsed with deionized (DI) water (Millipore, Billerica, Mass.), and filled it with the TE containing the DNA sample. Between experiments, the channel was rinsed with LE for 10 min.

Hybridization experiments: Hybridization experiments were performed similarly to the focusing experiments, but here, 5 mM $MgCl_2$ (Merck, Darmstadt, Germany) was included in the LE and sequentially, equal concentrations of molecular beacons (5'/5Cy5/CGAGCTCGTTTACRGCG-TGGACTACC AGCTCG/3BHQ_2/3', IDT, Coralville, Iowa) and complementary unlabeled target DNA (Sigma Aldrich, St. Louis, Mo.) were applied into the TE.

Bacteria focusing experiments: *Escherichia coli* culture (JM109 strain, a gift from Prof. Fishman, Technion) was grown in Luria-Bertani (LB) broth at 37° C. with vigorous shaking, to an optical density of 0.3 at 600 nm (OD600), corresponding to approximately $1.8 \times 10^8$ cfu/mL as measured by standard plating. The bacterial suspension was concentrated by centrifugation at 14,000×g for 2 min. Removing the supernatant, the pellet was resuspended in 0.85% NaCl and washed by an additional centrifugation step to remove significant traces of media. Next, the supernatant was removed and the pellet was resuspended in 0.85% NaCl, further SYTO9 dye (L-7002, Molecular Probes, Eugene, Oreg.) was added to a final concentration of 10 μM. The suspension was mixed and incubated at room temperature in the dark for 10 minutes. To discard remaining free fluorophores, the suspension was centrifuged, the supernatant was removed and the pellet was resuspended in TE to achieve the desired concentration. The composition of the LE was the same as in the focusing experiments, except for the concentration of bis-tris, which was 110 mM.

Temperature measurements: Temperature has a direct effect on ion solvation, the viscosity of the solution, and the dissociation constants of weakly ionized species, all of which affect the conductivity of the solution. As in the device of the invention, the resistance of the narrow channel dominates the overall device resistance, conductance (or resistance) readings were found to serve as an excellent indirect measure of the temperature within the narrow channel. To construct a calibration curve, the chip was fixed to an indium tin oxide-coated glass heating plate (HI-57Dp, Cell Micro Controls, Norfolk, Va.) controlled by a thermal controller (mTCII-HT, Cell Micro Controls, Norfolk, Va.), and the conductance in an LVF channel filled with LE was measured, by applying a low probing voltage (20 V) at fixed 10° C. intervals between 30° C. and 90° C. A 5 min waiting between measurements was applied and the temperature measurement was performed and confirmed to be stable within 0.5° C. of the set point before reading the current.

Fluorescence Image Processing

DNA focusing and hybridization experiments: all DNA imaging were performed with an upright microscope (AZ100, Nikon, Tokyo, Japan) equipped with a 5× objective (NA 0.5, AZ Plan Fluor, Nikon, Tokyo, Japan) set to 3× optical zoom, an LED light source (Sola, Lumencor, Beaverton, Oreg.) and a CMOS camera (Zyla, Andor, Belfast, UK). A Cy3 filter (TRITC-B-NTE, Semrock, Rochester, N.Y.) was used for observing labelled DNA (focusing experiments), a Cy5 filter (49006, Chroma, Bellows Falls, Vt.) for detecting molecular beacons (hybridization experiments). In the LVF chips, a detection point was chosen to be at a 1.4 cm downstream from the end of the converging region. For the DNA focusing experiments, the final (focused) concentration was calculated from a calibration curve constructed by filling the channel with known concentrations of DNA solution. The total amount of focused sample could then be found by spatially integrating over the resulting concentration map and multiplying by the depth of the channel. In the integration, a threshold of 10% of the peak value was used. It has been confirmed that no cross-contamination occurred between runs by comparing the fluorescence signature after ITP focusing in a new device in the absence of DNA to that in a device previously used to focus a high concentration of DNA. For the hybridization experiments the signal was calculated by integrating over a fixed 100×200 gim² region in the channel.

Bacteria focusing experiments: the bacteria were imaged on an inverted microscope (Eclipse Ti-U, Nikon, Tokyo, Japan) equipped with a 10× objective (NA 0.45, WD=4 mm, AZ Plan Apo, Nikon), an Intensilight C-HGFI light source (Nikon, Tokyo, Japan) and a Neo sCMOS camera (Andor, Belfast, UK). A FITC filter (49011, Chroma, Bellows Falls, Vt.) was used for SYTO9 (bacteria focusing). In the LVF chips, a detection point at 1.4 cm downstream from the end of the converging region was chosen. The bacteria were manually counted over 5 frames to account for any bacteria moving vertically into and out of the focal plane.

Example 2

100,000-Fold On-Chip Focusing of Analytes from Large Sample Volumes

In a physical implementation of the device in FIG. 2, it was observed that dispersion occurs as the ITP interface enters the narrow channel. This dispersion appears in the form of 'legs' which lead at the sidewalls of the converging region (FIG. 4). These legs are detrimental to the focusing as they cause the ITP interface to be elongated and dispersed in the narrow channel. This ultimately leads to lower focusing ratios and longer times required to recover a focused ITP interface.

The appearance of leading legs in the convergence can be mitigated by adding a chamber geometry to the narrow channel (FIG. 4). The legs, which enter the narrow channel before the tail, are slowed down by the lower electric field in the chamber, allowing the tail to catch up (as it experiences a higher field in the narrow channel). It is noted that the second convergence (at the right-hand side of the chamber) is too short for legs to redevelop, enabling the ITP interface to reach its final focused form very shortly after entering the narrow channel (several mm, as compared to several cm in channel geometries lacking a chamber).

Design Considerations for Large-Volume Focusing Devices

FIG. 5 presents the geometry of a non-limiting example of a large-volume focusing (LVF) chip of the invention. The entire chip has a uniform depth of 30 μm to support a single-mask microfabrication process, and consists of four key regions: a wide channel containing an array of pillars where a large sample volume is processed, a narrow channel where the final detection takes place, a converging section connecting the two, and a chamber that enables the refocusing of the dispersed ITP interface to a sharply focused state after the convergence.

A key point in the design of LVF chips is the control of dispersion throughout the path of the ITP interface. If the sample arriving at the entrance of the narrow channel is dispersed, the high electric field in the narrow region causes fast electromigration of the front part of the focused sample while the rear lags behind. This results in further dispersion of the ITP interface to the extent that the front part may reach the leading electrolyte reservoir before the rear fully enters the channel, and the analyte is unable to re-focus as it transitions through the narrow channel.

Figure 14A:
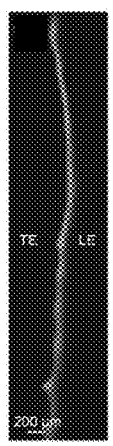
FIGS. 14A-B present an experimental comparison of the ITP interface in the wide region of the LVF chip, in the absence and presence of pillars. In the absence of pillars, significant oscillations of the ITP interface were observed, together with non-uniformity in the lateral direction (FIG. 14A). Adding a pillar array to the wide region contributes to viscous resistance, resulting in a straight interface throughout the channel (FIG. 14B).

Two main sources of sample dispersion were identified. First, electromigration in the wide region of the channel is susceptible to electrokinetic instability, leading to observable spatial frequencies developing in the lateral direction (FIG. 14). As shown in FIG. 14A, a staggered array of cylindrical pillars with a diameter of 50 μm and a center-to-center pitch of 100 μm to reduce the characteristic lateral dimension for viscous action were used, resulting in a straight ITP interface throughout the section (FIGS. 14 & 15).

Figure 5A:
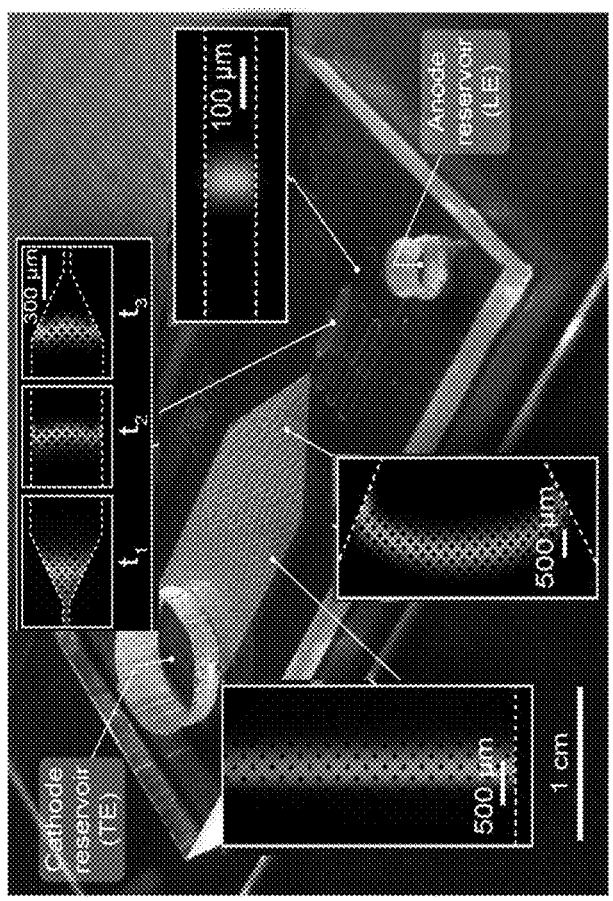
FIG. 5A-B present photograph of a large-volume ITP device. Insets show a focused fluorescent dye. The analyte first focuses uniformly across the entire width of an 8 mm wide region. The wide region tapers down to a width of 100 µm, providing additional geometrical focusing. An intermediate chamber geometry enables smooth refocusing of the interface from its dispersed state. In the final narrow region, the ITP interface rapidly achieves its steady focused state before detection (FIG. 5A). Top-view schematic of the device (FIG. 5B). The primary device has a depth of 30 µm and dimensions $w_w$=8 mm, $l_w$=1.2 cm, $w_n$=100 µm, $l_n$=2 cm, $\theta$=30°, $l_c$=6.5 mm, and uniform array dimensions d=50 µm, p=100 µm and $\beta$=45°. Accounting for the occlusion of the channel by pillars, the effective width and length of the wide region are $w_{w,eff}$=5.25 mm and $l_{w,eff}$=8.2 mm, respectively.

The second cause for dispersion is the radially decaying electric field near the entrance to the narrow channel section, which leads to a curved ITP interface and 'legs' leading along the sidewalls (see FIG. 5A). This effect is worsened by Joule heating in the narrow section. The intermediate chamber shown in FIG. 5A allows the sample to refocus and enter the final narrow channel uniformly (see additional designs tested in FIGS. 16, 18 and Table 1), after which the length of the ITP interface is once again determined by the balance between diffusion and electromigration.

Figure 14B:
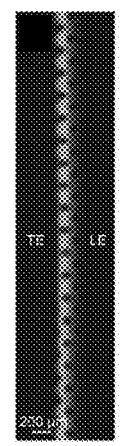
Figure 15:
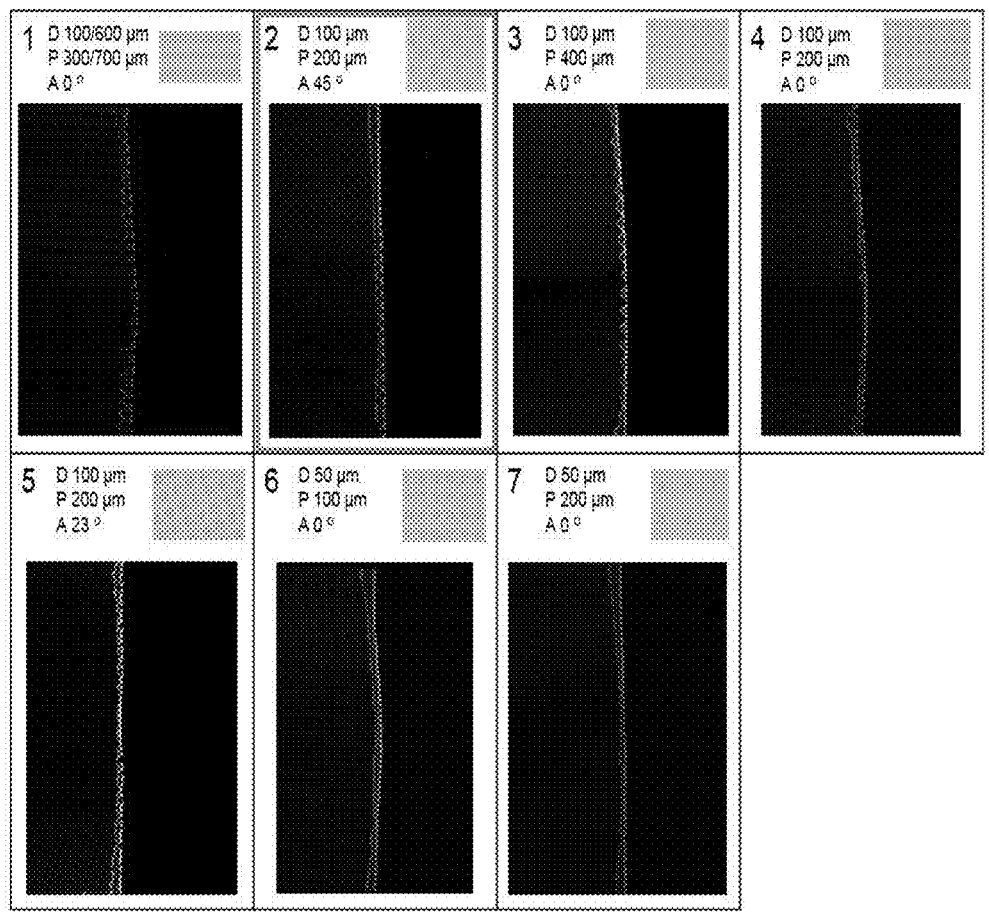
FIG. 15 presents experimental results showing ITP focusing in the wide region for pillar configurations with varying diameter (D), center-to-center pitch (P) and angle w.r.t. the electric field (A). A design with D=50 µm, P=100 µm and A=45° was used, as this was found to give the most uniform ITP interface. The broad (dual) peaks that appear when focusing Dylight 650 NHS highlights any non-uniformities along the interface, such as in geometry 1.
Figure 16A:
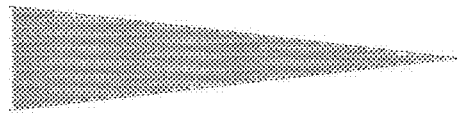
FIGS. 16A-D present top-view schematics of devices with different tapering angles $\theta$ of the converging region. $\theta$=10° (FIG. 16A), $\theta$=30° (FIG. 16B), $\theta$=40° (FIG. 16C), and $\theta$=600 (FIG. 16D). Lower values of $\theta$ are less preferred due to the limited internal volume, while higher values of $\theta$ enable large internal volumes but may adversely affect focusing in the converging region. The best performance was observed with $\theta$=30°.
Figure 16B:
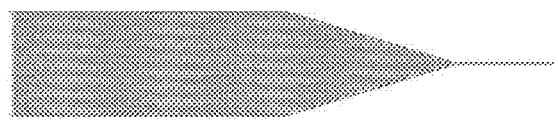
Figure 16C:
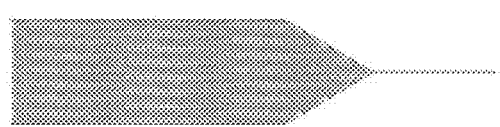
Figure 16D:
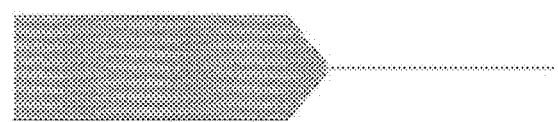

FIG. 14 presents a comparison of the shape of the ITP interface in the wide channel, with and without the pillar array. The pillar-free channel in a 300 μm PDMS layer was fabricated and the top side was bonded to a glass slide which acted as an external structural support to prevent the collapse of the channel's 'ceiling'. FIG. 14A shows the lateral non-uniformities of the ITP interface that occur in the absence of pillars. It was hypothesized that these disturbances (which also oscillate in time) are related to electrokinetic instability of the interface. The addition of pillar structures results in a highly uniform and stable propagation of the interface (FIG. 14B).

To determine the required pillar distribution, several pillar configurations were fabricated and their performance was evaluated by focusing Dylight 650 NHS (Thermo Fischer, Waltham, Mass.) and observing the uniformity and symmetry of the focused dye across the width of the channel. Of the configurations shown in FIG. 15, the best performance was obtained using a staggered array positioned at an angle of 45° with respect to the electric field. Of the configurations with the same angle, smaller pillar diameters (D=50 μm) and pitch (P=100 μm) led to better uniformity than the larger pillars with larger pitch (D=100 μm, P=200 μm), and were therefore selected for this work.

ITP Interface in Converging Channels

The tapering angle of the converging region between the wide and narrow section of the channel must be chosen to minimize dispersion of the ITP interface while maximizing the internal volume of the chip. FIG. 16 shows the geometries tested to this end, with a tapering angle θ between 10° and 60°. While lower tapering angles are preferred as they cause less sample dispersion, they lead to smaller internal volumes, and therefore reduce the processed sample volume. Conversely, higher tapering angles enable a larger internal volume, but lead to more dispersion. It was found that geometries with an intermediate tapering angle θ=30° provided a good trade-off between dispersion and internal volumes.

Figure 17A:
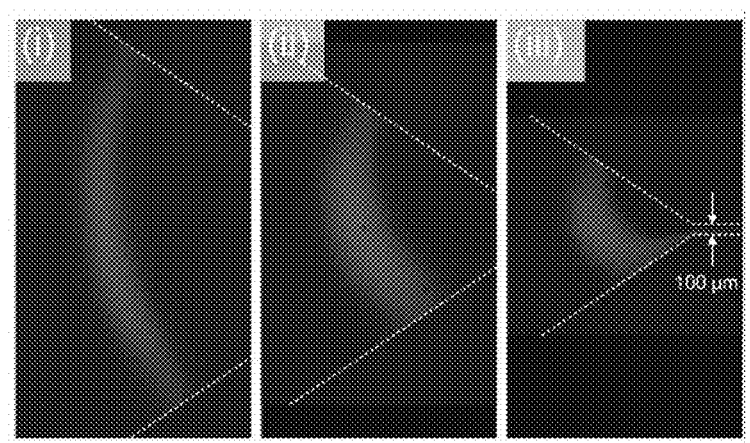
FIGS. 17A-C present fluorescent images of the ITP interface at the boundary between the converging and narrow region, in the presence and absence of pillars. With very sparse pillars (which act only as structural support and can be approximated as the absence of pillars) the ITP interface typically progresses asymmetrically, so that one side reaches the narrow channel before the other (FIG. 17A). Different parts of the ITP interface reach the narrow region at different times, leading to elongation of the interface and dispersion over length scales from which refocusing within the length of the narrow channel in not feasible. This asymmetry can be corrected by adding an array of pillars to the channel (FIG. 17B). 'Legging' of the sample as it enters the narrow channel still results in significant dispersion, but a focused interface can be recovered, e.g. by adding a chamber geometry to the narrow region (FIG. 17C).
Figure 17B:
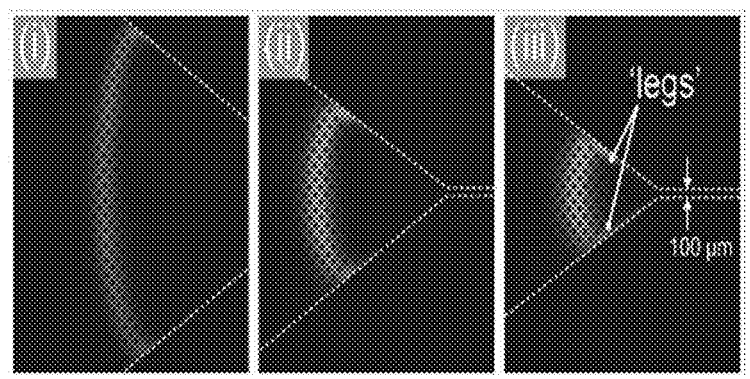
Figure 17C:
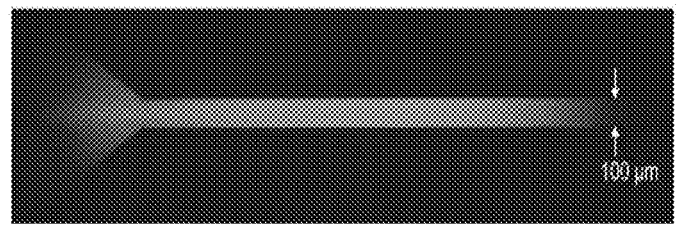

While FIG. 14 shows the need for pillars in the wide region, it was found that a similar requirement holds in the converging region. FIG. 17A illustrates how, in the absence of pillars (tested using a very sparse array of narrow pillars), the ITP interface enters the narrow channel asymmetrically, resulting in dispersion in the narrow channel. Adding a dense array of larger pillars (FIG. 17B) greatly improves the robustness of focusing and consistently results in symmetric focusing. However, dispersion is not completely eliminated, as some of the sample closer to the sidewalls still enters the narrow channel before the rear of the interface (FIG. 17C).

Figure 18A:
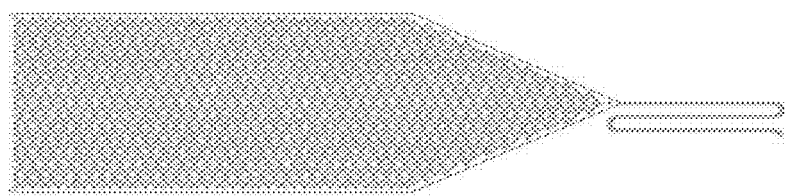
FIGS. 18A-H present top-view schematics of the large-volume focusing geometries tested, which include geometrical features before the entrance to the narrow channel, aimed at recovering a focused interface from its dispersed state at the end of the converging region. Control with a sparse pillar array (FIG. 18A), sparse pillar array in the wide region and dense pillar array in the converging region (FIG. 18B), Gradual tapering (FIG. 18C), Step-wise tapering (FIG. 18D), 1 mm long chamber with sparse pillars (FIG. 18E), 3 mm long chamber with sparse pillars (FIG. 18F), diamond chamber with sparse pillars (FIG. 18G), 3 mm chamber with dense pillars (FIG. 18H). The best performance was achieved with configurations (h) and (e).
Figure 18B:
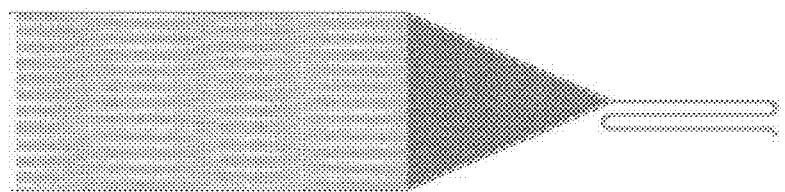
Figure 18C:
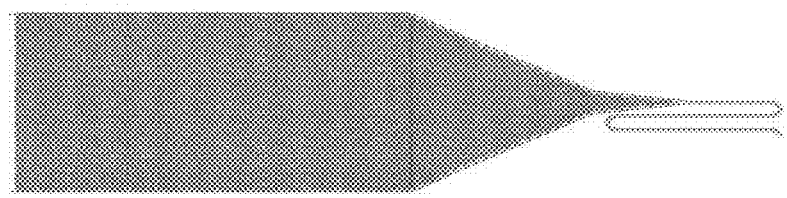
Figure 18D:
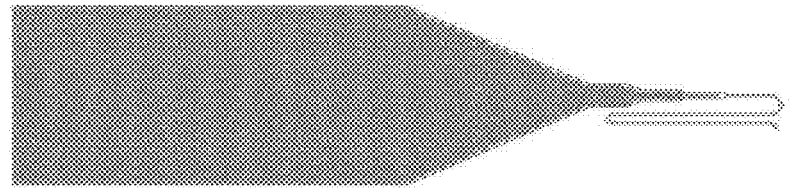
Figure 18E:
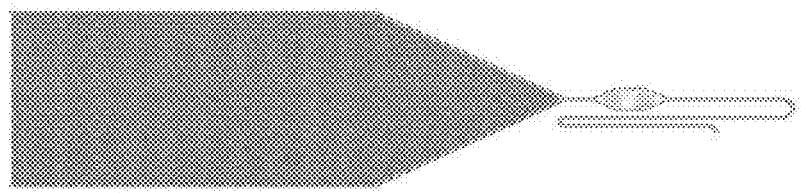
Figure 18F:
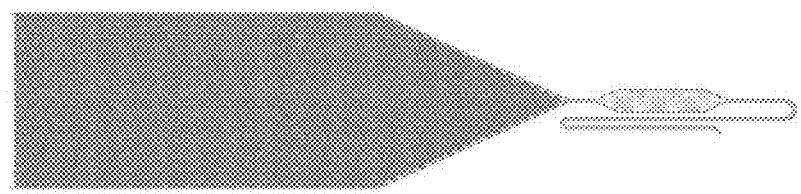
Figure 18G:
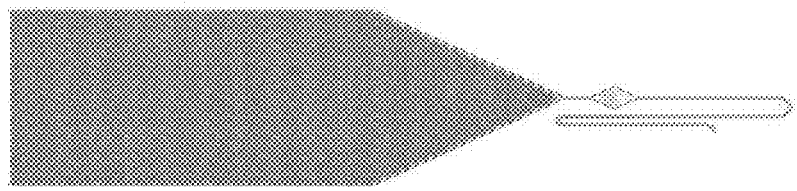
Figure 18H:
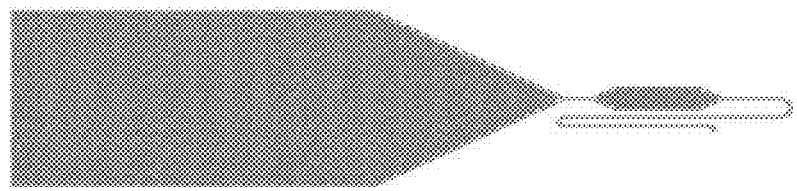

The dispersion due to 'legs' can be overcome by adding geometrical features near the entrance to the narrow channel. FIG. 18 shows several designs with such features, which include moderate tapering angles and step-wise tapering. A lower tapering angle at the end of the converging region (FIG. 18C) did not reduce dispersion. Step-wise tapering (FIG. 18D) largely prevented dispersion, but was found to be less robust than the chamber geometry (FIG. 18E-H), where the channel widens to slow down the fast-moving front, while allowing the rear part of the interface to close the gap. Varying the length of the chamber changes the time allowed for the interface to recover. In the short chamber (FIG. 18G) the interface does not become uniform ('straight') before reaching the end of the chamber. The best performance was achieved with a 3 mm long chamber incorporating a dense pillar array (FIG. 18H), followed by the 1 mm long chamber with a sparse pillar array (FIG. 18E).

TABLE 1: Peak fluorescence intensity and width of the ITP interface for each of the devices in FIG. 18, measured 1.4 cm downstream of the first entry into the narrow channel. The width was defined as the distance between the locations at which the signal drops to 10% of its peak value. Design (h) consistently showed the best performance, both in terms of peak fluorescence intensity and interface width.

| Device in FIG. 18 | Experiment 1 | | Experiment 2 | |
|---|---|---|---|---|
| | peak [A.U.] | width [px] | peak [A.U.] | width [px] |
| A | 1200 | 1400 | 500 | 3200 |
| B | 900 | 1700 | — | — |
| C | 2100 | 650 | 1200 | 1050 |
| D | 2500 | 675 | 2200 | 790 |
| E | 6500 | 200 | 5500 | 190 |
| F | 2900 | 300 | 3000 | 390 |
| G | 1500 | 630 | 800 | 2000 |
| H | 8400 | 140 | 6500 | 180 |

Electrode Placement

As is described by Persat, Suss and Santiago (2001, Anal. Chem. 81, 9507-9511), the placement of electrodes in the reservoir of an electrophoresis chip may affect the focusing result. Two general recommendations for electrode placement are given: "(i). the wire is kept well away from the channel entrance to mitigate the effects of pH changes and bubbles generated by the electrode; and (ii). placing the tip of the wire at the bottom of the reservoir is easier to reproduce (vs. suspending the wire part way down the reservoir)."

These recommendations were heeded by using x,y,z-micropositioners (SE40, Perfict Lab, Shenzhen, China) with a custom electrode holder to position the platinum electrodes (diameter 0.5 mm) in a reproducible way. The electrodes were always placed vertically along the wall of the reservoir diametrically opposite the channel entrance, and the z-stage was adjusted so that the electrode came in contact with the floor of the reservoir.

Approximation of Constant Current During Electromigration Through the Wide Channel Section For an LVF channel of depth $H_c$, comprising a wide-channel section of effective width $w_{w,eff}$ and length $l_{w,eff}$ (both accounting for the occlusion of the channel by pillars) filled with an electrolyte with conductivity $\sigma_w$, connected in series to a narrow-channel section of width $w_n$ and length $l_n$ containing an electrolyte with conductivity $\sigma_n$, the ratio of the electrical resistances of the wide and narrow channel is $R_w/R_n = \sigma_n w_n l_{w,eff} / \sigma_w w_{w,eff} l_n$.

Initially, the whole channel is filled with LE, $\sigma_n = \sigma_w = \sigma_{LE}$ and $R_w/R_n = w_n l_{w,eff} / w_{w,eff} l_n$. With the dimensions of the tested LVF chips, $l_{w,eff}=8.2$ mm, $l_n=2$ cm, $w_{w,eff}=5.25$ mm and $w_n=100$ μm, $R_w/R_n=0.0078$ is found and the resistance of the wide region can be safely neglected.

As the ITP interface progresses into the channel, the contribution of the wide region to the total channel resistance increases. At this point, $\sigma_n = \sigma_{LE} = 1.01$ S/m (for LE consisting of 200 mM bistris, 100 mM HCl) and $\sigma_w = \sigma_{TE,adjusted} = 0.07$ S/m (for TE consisting of 20 mM bistris, 10 mM tricine), so that $R_w/R_n=0.11$. This is the maximum contribution of the wide region to the overall resistance of the channel, as further progression of the ITP interface would lead to low-conductivity TE entering the narrow region, once again increasing the voltage drop over the narrow channel. Therefore, it can be safely assumed that the voltage drops over the wide region never exceeds 15% of the applied voltage. Using the approximation that the resistance of the narrow channel dominates the overall resistance, the current during electromigration of the interface through the wide region can be expressed as $I = V w_n H_c \sigma_{LE} / l_n$.

Joule Heating and Assay Time in Large-Volume ITP Devices

Figure 5B:
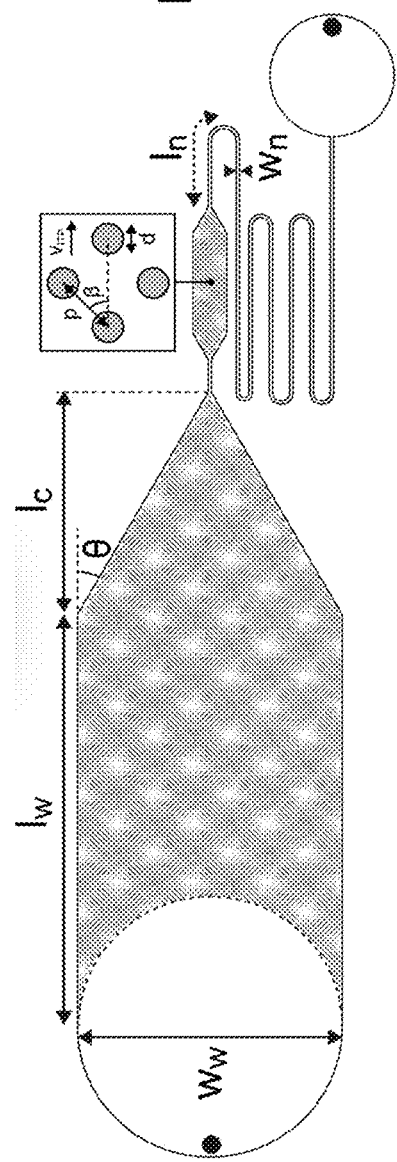

As illustrated in FIG. 5B, consider a planar LVF channel of depth He comprising a wide-channel section of effective width $w_{w,eff}$ and effective length $l_{w,eff}$ filled with an electrolyte with conductivity $\sigma_w$, connected in series to a narrow-channel section of width $w_n$ and length $l_n$ containing an electrolyte with conductivity $\sigma_n$. The ratio of the electrical resistances of the wide and narrow channel is then $R_w/R_n = \sigma_n w_n l_{w,eff}/\sigma_w w_{w,eff} l_n$. The relative resistance of the wide section reaches a maximum when the ITP interface is at the border between the two sections. As the conductivity of the adjusted TE is typically around 10% of that of the LE (for the chemistry used in this work, $\sigma_{LE}/\sigma_{TE} \approx 15$), the narrow channel continues to account for more than 85% of the voltage drop V at all times (see Supplementary Information section S4). Hence, during electromigration of the ITP interface through the wide section of the channel, the electric current can be assumed constant, $I = V w_n H_c \sigma_{LE}/l_n$.

As the velocity of the interface in the wide region is much lower than in the narrow region, the migration time through the wide region will dominate the total time required to perform an assay. In the following, therefore, only the wide region was considered. The current in the system can be assumed constant, so that the electric field in the LE is $E_{LE} = I/(\sigma_{LE} w_w H_c) = V w_n/(w_w l_n)$ and the time for the interface to reach a location x in the channel is simply $t(x) = x/\mu_L E_{LE}$ $(x l_n/\mu_L V)(w_w/w_n)$, where $\mu_L$ is the effective electrophoretic mobility of the LE. Substituting $x = l_w$, the time required for the interface to migrate through the wide channel becomes $$t_A = \frac{l_w l_n}{\mu_L V} \frac{w_w}{w_n}. \quad (1)$$

At the same time, heat generation per unit volume is governed by the narrow channel, where the electric field is highest. On the timescale of electromigration, the device reaches thermal equilibrium, and following a similar analysis to that presented by Zehavi et al. Phys. Rev. Appl. 2016, 5 (4), 044013, the temperature increase is governed by a balance between Joule heat generation and dissipation through the glass bottom of the chips to the microscope stage, which is assumed fixed at room temperature:

$$\Delta T = \frac{\sigma_{LE} H_c d_{glass}}{k_{glass} l_n^2} V^2 \quad (2)$$

At high current densities, Joule heating in the narrow channel can lead to the formation of gas bubbles. The effect of Joule heating can be mitigated either by reducing the conductivity of the LE, or by reducing the electric field. The formation of bubbles was suppressed by reducing the concentration of LE by one order of magnitude from a 200 mM bistris and 100 mM HCl formulation to 20 mM bistris and 10 mM HCl. This had the effect of reducing the conductivity from $\sigma_{LE} = 0.835$ S/m to $\sigma_{LE} = 0.094$ S/m. This approach was preferred over reducing the electric field, as the field affects the velocity of the ITP interface $U_{ITP} = \mu_{LE} E_{LE}$ and thus the assay time.

Figure 11A:
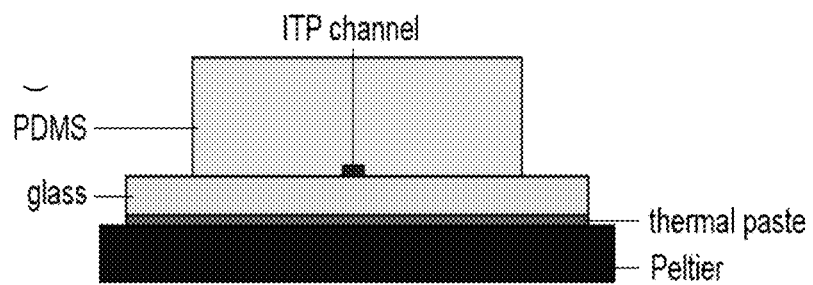
FIGS. 11A-B present a non-limiting schematic cross-section of cooling configurations for the PDMS ITP channel on a standard glass substrate: Peltier element (FIG. 11A), and side-channels for coolant running parallel to the ITP channel (FIG. 11B).
Figure 11B:
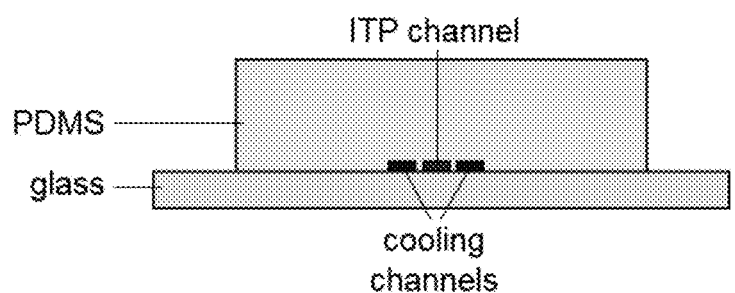
Figure 12:
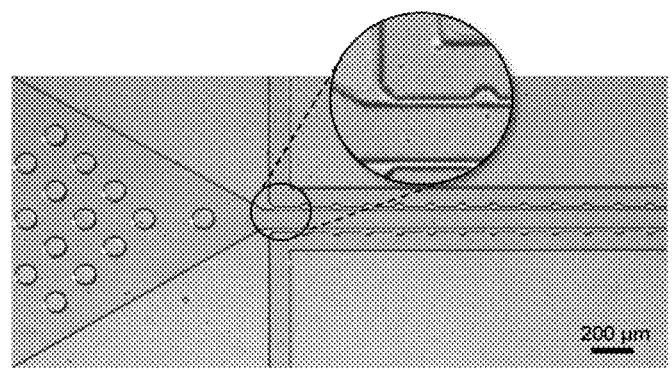
FIG. 12 presents a micrograph showing the end of the converging section and part of the narrow channel, with cooling channels on both sides of the narrow channel.

Although reducing the conductivity of the LE prevents the formation of bubbles, it also leads to a lower focusing ratio. In order to regain the factor lost in the focusing ratio, an alternative approach to eliminating Joule heating is to actively cool the large-volume device with, e.g., a Peltier cooling element (FIG. 11A) or side channels for convective dissipation from the sidewalls of the channel (FIG. 11B).

Thermal Equilibrium in the LVF Chip

Joule heat generated in the narrow channel is transferred downwards through the glass substrate to the microscope stage, and upwards to the surface of the PDMS. Following a similar analysis as presented by Zehavi et al. Phys. Rev. Appl. 2016, 5 (4), 044013, convection at the upper surface of the PDMS was considered and an isothermal condition at the lower surface of the glass slide was used, which is in contact with the glass microscope stage and can therefore be considered to be at room temperature. The combined thermal resistance of the PDMS on top of the channel and of free convection in air is $R_{PDMS} = d_{PDMS}/k_{PDMS} + 1/h = 0.12$ m$^2$KW$^{-1}$ (for h=10 Wm$^{-2}$K$^{-1}$, $d_{PDMS}$=3 mm, and $k_{PDMS}$=0.15 Wm$^{-1}$K$^{-1}$)$^3$, and through the glass bottom, in contact with to the microscope stage, $R_{glass} = d_{glass}/k_{glass} = 1 \times 10^{-3}$ m$^2$KW$^{-1}$. Since $R_{PDMS}$ and $R_{glass}$ are parallel thermal resistances, heat conduction through the glass substrate is dominant. Further, since $d_{glass}^2/\alpha$=2 s is much shorter than the typical experiment time, a steady state may be assumed and the heat equation can be simplified to:

$$Q = \sigma_{LE} E^2 = \frac{\Delta T}{H_c} \frac{1}{R_{glass}}$$

where $\Delta T$ is the difference between the temperature in the channel and the ambient temperature. Rewriting this, and using the approximation that the narrow channel accounts for most of the voltage drop, the following equation was obtained:

$$\Delta T = \frac{\sigma_{LE} H_c d_{glass}}{k_{glass} l_n^2} V^2.$$

Applied Voltage

Figure 13A:
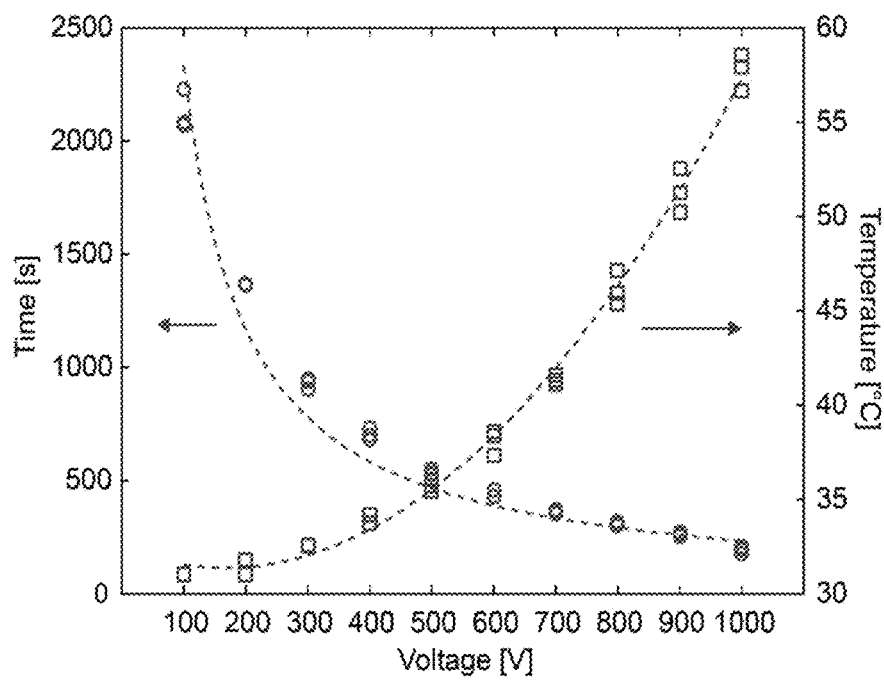
FIGS. 13A-B present total migration time and maximum temperature in the narrow region of a large-volume focusing (LVF) device disclosed herein. The operating voltage of a large-volume device determines the trade-off between assay time (left axis) and maximum temperature (right axis) (FIG. 13A). Calibration measurements of channel conductance at forced temperatures, which were used to map conductance values to temperature (FIG. 13B).
Figure 13B:
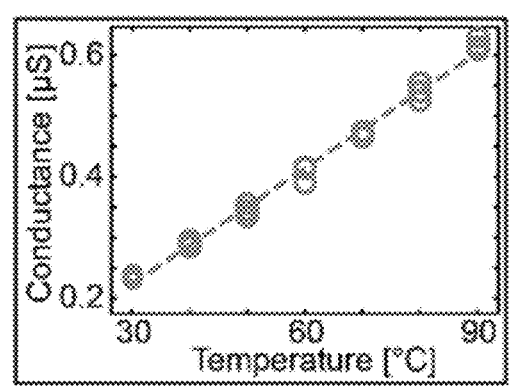

FIG. 13 presents experimental measurements of the assay time and the maximum temperature in the narrow region of the LVF chip of the invention as a function of the applied voltage. As expected, the assay time is inversely proportional to the applied voltage, whereas the maximum temperature in the narrow region scales quadratically with voltage. The dashed lines show the best fit to 1/V and V$^2$ dependences, with R$^2$ values of 0.961 and 0.998, respectively. The fit of the temperature as a function of voltage yields a second-order polynomial coefficient (for the V$^2$ term) of $p_1 = 3.73 \times 10^{-5}$. Substituting $\sigma_{LE}$=1.01 S/m, $H_c$=30 μm, $d_{glass}$=1 mm, $k_{glass}$=1 Wm$^{-1}$K$^{-1}$ and $l_n$=2 cm into equation (2) yields $p_1 = 7.1 \times 10^{-5}$, indicating that the model provides a good quantitative estimate of the scaling, and enables order-of-magnitude predictions of the temperature in the narrow channel, though clearly 2D effects of heat dissipation into the PDMS result in fast heat removal in practice.

For some applications, such as immunoassays, it is important to maintain a sufficiently low temperature (typically <40° C.) in the channel to avoid denaturation of proteins or antibodies. The results of FIG. 13 indicate that, for the presented geometry, voltages of up to 700 V can be applied while still maintaining sufficiently low temperatures and achieving a reasonable total assay time of ~7 min. When higher temperatures are allowed, or perhaps even desired (e.g. for enhancing the specificity of hybridization assays), higher voltages can be applied, reducing the assay time to as little as 3 min at 1000 V.

ITP Focusing from Large Sample Volumes

Figure 6A:
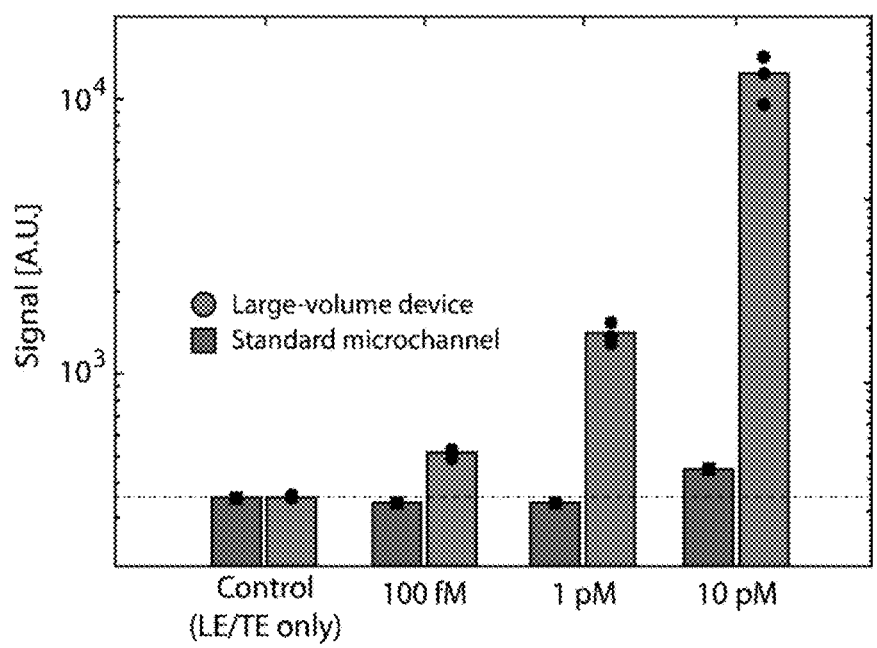
FIGS. 6A-B present experimental results demonstrating the applicability of the device disclosed herein for focusing of Cy3-labeled 15-nt DNA (FIG. 6A), achieving a 100-fold enhancement in signal and limit of detection compared to a standard microchannel (FIG. 6B). The electrolyte solution consists 20 mM pyridine, 10 mM HCl and 1% w/v PVP).
Figure 6B:
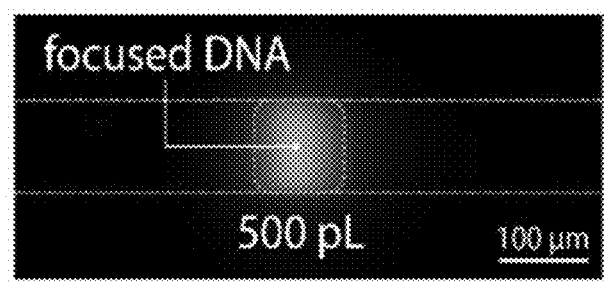
Figure 9A:
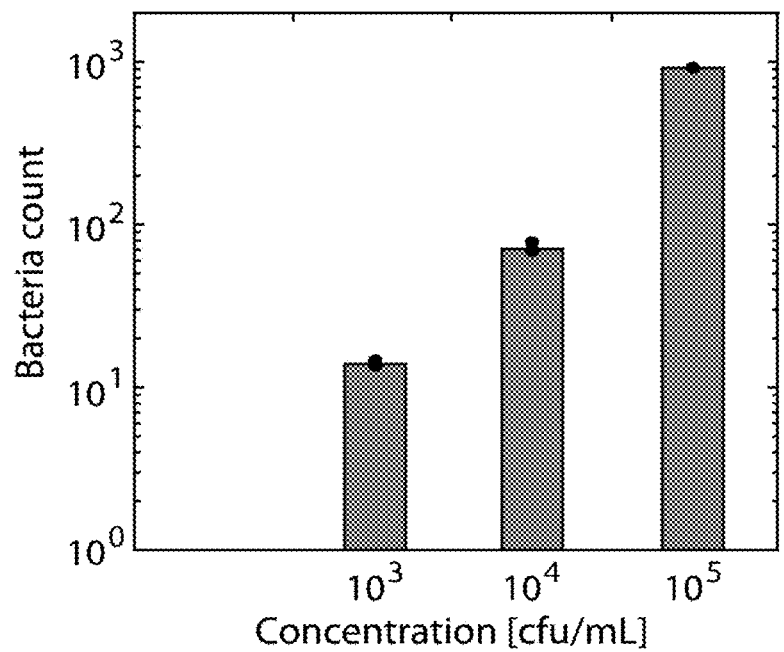
FIGS. 9A-B present experimental results demonstrating the use of the device disclosed herein for direct focusing of whole bacteria (*E. coli* JM109 labeled with SYTO9), between 10$^3$ and 10$^5$ cfu/mL (FIG. 9A). Fourteen bacteria focused from an initial concentration of 10$^3$ cfu/mL into a final volume of 1.1 nL, corresponding to a concentration enhancement of ~13,000-fold and a processed volume of 14 µL (FIG. 9B). The electrolyte solution consists 20 mM pyridine, 10 mM HCl and 1% w/v PVP).
Figure 9B:
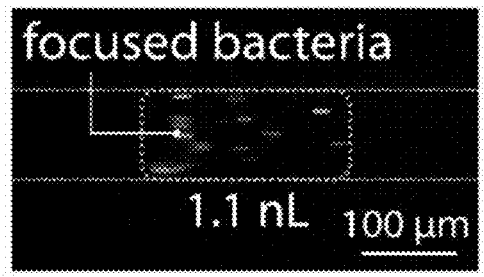

FIG. 6 shows experimental results of DNA focusing of ITP in a large-volume device. Cy3-labeled 15-nt DNA was focused and the ITP focusing was quantified by integrating the fluorescence signal over a fixed region of interest. These results show a minimum detectable concentration of 10 fM. The dashed lines indicate 3σ on both sides of the mean. Uncertainty bars represent the two-sided 95% confidence interval according to Student's t-test based on 5 experiments per data point. These experiments were performed at 700 V, with an LE of 200 mM bistris, 100 mM HCl, 1% w/v PVP. The TE was 20 mM bistris and 10 mM tricine. Using 8 mm wide version of the device, the inventors were able to obtain a focusing ratios of 18,000-50,000 and a 100 fM limit of detection. This achievement indicates a 100-fold enhancement in the signal and limit of detection of fluorescently labeled DNA as compared to standard microchannels. Furthermore, using this device the inventors were able to focus and detect fluorescently labeled whole bacteria from concentrations in the TE of $10^3$ cfu/mL (FIG. 9). As a non-limiting example, the TE consisted of 20 mM bistris and 10 mM tricine; the LE consisted of 20 mM pyridine, 10 mM HCl and 1% w/v PVP. The applied field was 200 V/cm.

Figure 7A:
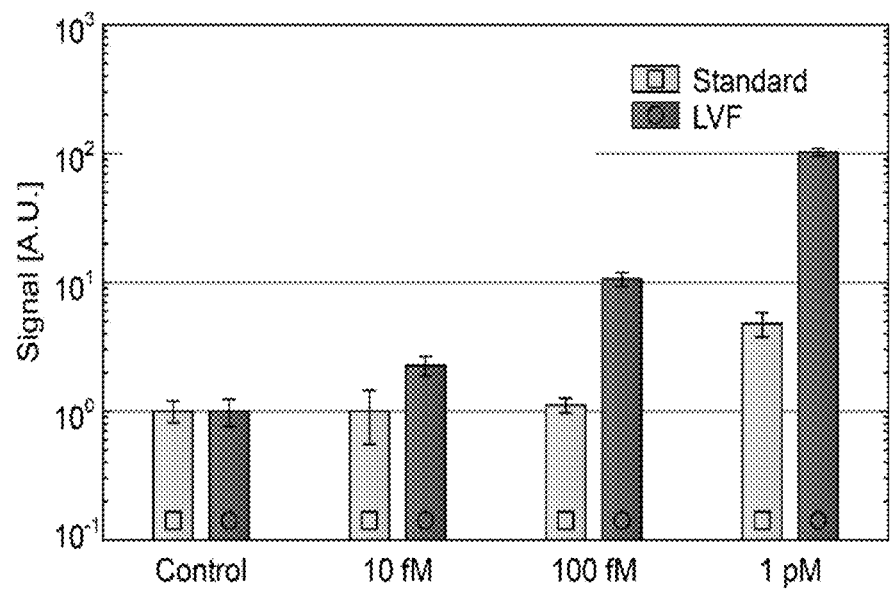
FIGS. 7A-B present experimental results of ITP focusing of Cy3-labeled DNA. Comparison between focusing in a LVF chip and in a standard microchannel (FIG. 7A). The results show a minimum detectable concentration of 10 fM in the LVF chip, which is 2 orders of magnitude lower than in the standard microchannel. Due to differences in channel geometry between the LVF and the standard microchannel, the integrated signal values were normalized by the relevant control signals. Signal values should therefore only be compared within the same device. However, the LoD can be compared between devices, as it is a measure of the lowest detectable signal. Uncertainty bars represent the two-sided 95% confidence interval according to Student's t-test based on 5 experiments per data point. Fluorescence image of Cy3-labeled DNA focused into a plug with a volume of ~350 µL (FIG. 7B).
Figure 7B:
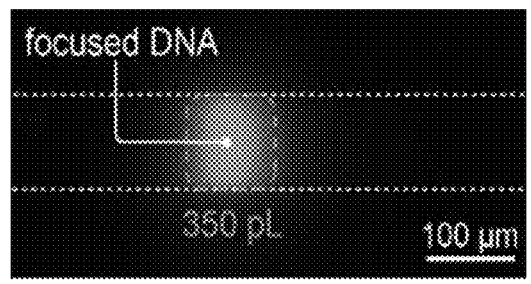

FIG. 7 presents experimental results comparing the focusing of pre-labelled DNA in the LVF chip to focusing on a standard commercial chip (Caliper NS-95x, with a channel width of 35-75 m, a depth of 12 μm and total length of 3.5 cm). This chip was chosen as a benchmark, as it is commercially available, and widely used for on-chip CE experiments. The results presented show that the LVF chips enable a 310,000-fold increase in peak concentration (n=4, std=54,000): from an initial concentration of 10 fM to a peak concentration of 3.1 nM. This results in a 100-fold improvement in the limit of detection (LoD, defined as the lowest concentration giving a signal higher than three times the standard deviation of the negative control) as compared to standard NS-95x chips: from 1 pM in standard chips to 10 fM in LVF chips.

It is also instructive to compare the sample volume that has been processed in each of the chips. The processed volume was found by calculating the total mass contained in the ITP peak and dividing the resulting value by the initial concentration of the sample. This results in a processed volume of 49.7 μL (n=4, std=3.9 μL) in LVF chips, compared with 483 nL (n=5, std=110 nL) for the standard NS-95x chips.

While the peak concentration is a relevant figure of merit for direct detection assays, a more relevant figure of merit for binding assays is the mean concentration of the focused sample. The mean concentration, which was found by calculating the total mass contained in the ITP peak and dividing this by the volume of the focused plug, was increased in the LVF chip by a factor of 104,000 over the initial concentration in the reservoir (n=4, std=31,000).

Application of LVF Chips to Homogeneous Hybridization Assays

Figure 8A:
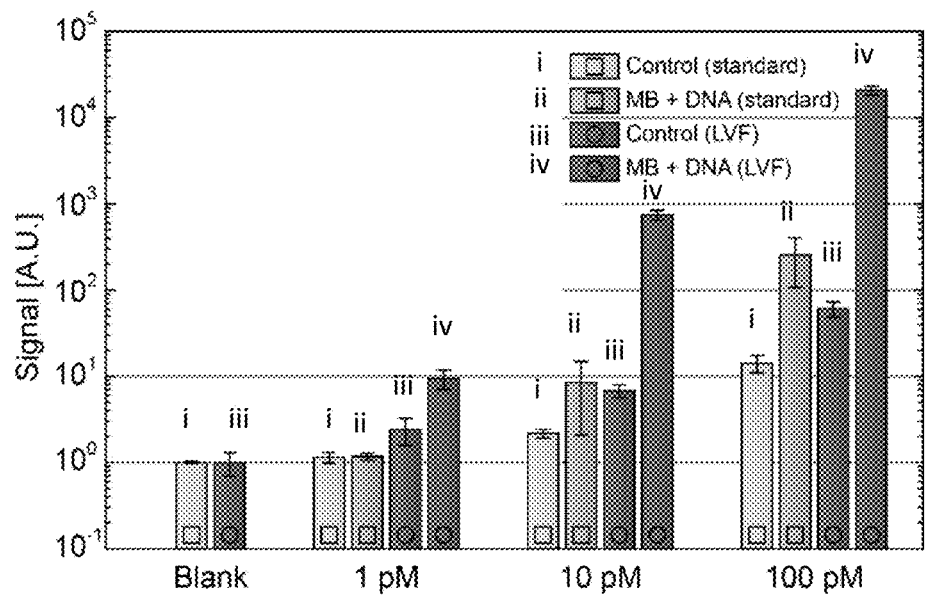
FIGS. 8A-B present experimental results comparing accelerated hybridization of molecular beacons (MBs) and DNA oligonucleotides in a large-volume focusing chip and in a standard glass chip. Fluorescence intensity of MBs only (control) and of hybrids after 450 s (FIG. 8A). The results of a paired t-test between the signal after hybridization and the signal of the control (FIG. 8B). The enhanced reaction kinetics in an LVF chip enable direct detection of 1 pM DNA with 1 pM MB (p=2.8×10$^{-3}$). Uncertainty bars represent the two-sided 95% confidence interval according to Student's t-test based on 5 experiments per data point.

To study the potential benefits of the LVF chip for homogeneous hybridization assays (i.e., in the bulk), DNA detection experiments were performed at the ITP interface using molecular beacon (MB) probes. FIG. 8A shows the signal obtained from 450 s ITP hybridizations performed in either standard or LVF chips.

Figure 8B:
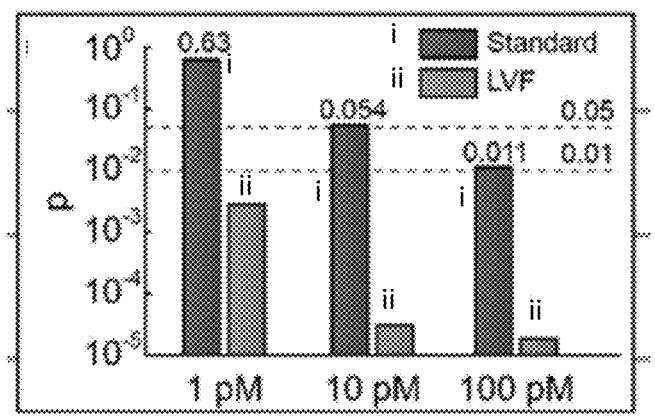

To characterize the ability of this detection method to distinguish between a hybridization signal and the control (containing only probes), FIG. 8B shows the p-value for a paired sample t-test between each signal and its control. The signal in LVF chips is significantly distinguishable from the control ($p<0.01$) at 1 pM, whereas in standard chips a value of $p<0.01$ is obtained only above 100 pM The relative importance of the hybridization reaction in the wide and narrow regions is determined by the transit time through either region, weighted by the channel width (which affects the concentration). Evidently, despite the short time (~10 s) spent in the narrow region by the focused target, the 100-fold geometrical focusing makes this reaction time equivalent to 1000 s of hybridization at lower concentrations in the wide region, ultimately enabling the low limit of detection.

Application of LVF Chips to Focusing of Bacteria

Armstrong et al. Anal. Chem. 71, 5465-5469 (1999) and Schneiderheinze et al. FEMS Microbiol. Lett. 189, 39-44 (2000) have demonstrated separation of bacteria using capillary electrophoresis, and focusing of bacteria has also been demonstrated, with Phung et al. ELECTROPHORESIS 34, 1657-1662 (2013) detecting concentrations as low as 100 cfu/mL on a capillary electrophoresis apparatus. However, translation of the assays to an on-chip format has so far been limited by the volumes that could be processed; to enable on-chip detection at low concentrations, the processed sample volume must be sufficiently large to ensure that at least several of the bacteria present in the sample are focused by ITP.

Figure 10A:
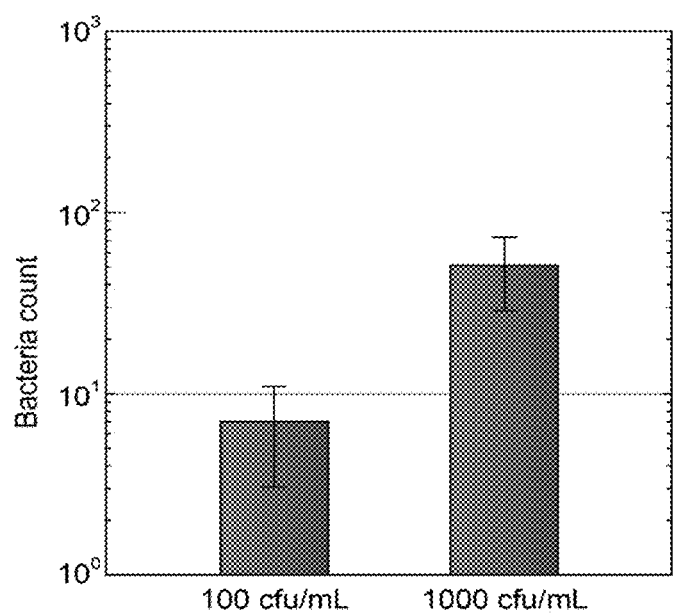
FIGS. 10A-B present experimental results demonstrating direct focusing of *E. coli* JM109 labelled with SYTO9 in the disclosed large-volume focusing chip. From an initial concentration of 100 and 1000 cfu/mL, ~7 and ~50 bacteria were respectively counted at the detection site (n=5) (FIG. 10A). The bacteria are focused from an initial concentration of 100 cfu/mL into a compact plug with a final volume of 300 µL (FIG. 10B). Uncertainty bars represent the two-sided 95% confidence interval according to Student's t-test based on 5 experiments per data point.
Figure 10B:
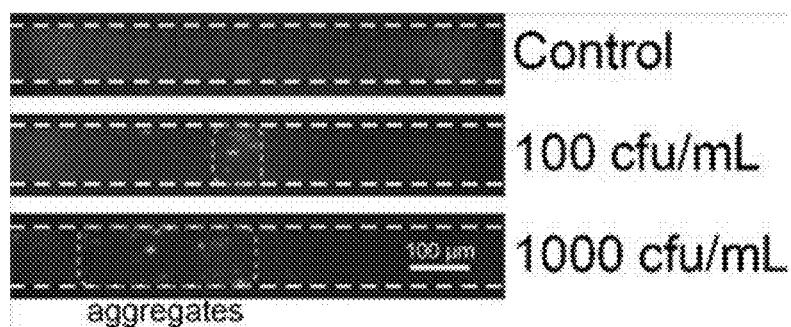

FIG. 10 shows the number of bacteria counted at the ITP interface using the LVF chip presented herein, providing a limit of detection of 100 cfu/mL. From initial concentrations of 100 and 1000 cfu/mL, an average of 7 bacteria (n=5, std=3.1) and 50 bacteria (n=5, std=17.8) were recovered respectively, in approximately 7 min. This indicates a processed sample volume between 50 and 70 μL, which is in good agreement with the DNA focusing experiments.

At an initial concentration of 100 cfu/mL, the bacteria are focused into a final volume of ~300 μL. At higher initial concentrations (e.g. 1000 cfu/ml, see FIG. 10b) the bacteria appear to aggregate, and the plug is more dispersed. Nevertheless, as the mobility of the TE and LE are far apart ($\mu_T=11.3\times10^{-9}$ m$^2$/Vs, $\mu_L=79\times10^{-9}$ m$^2$/Vs), focusing of both bacteria and aggregates is expected. It has been hypothesized that aggregates have different electrophoretic mobilities than single bacteria, causing them to focus at various ITP interfaces formed by additional species (e.g. carbonic acid) which are naturally present in the sample.

Example 3: Conclusions

A microfluidic chip for ITP focusing of analytes from 50 μL sample volumes was presented. The large-volume focusing chip presented herein consists of a wide region tapering down to a 100-fold narrower channel, and contains geometrical features designed to reduce dispersion arising from non-uniform entry of the ITP interface into the narrow region. This dispersion-limiting design allows the dimensions of the chip to be scaled up for processing larger volumes without loss of focusing.

The dimensions of the LVF chip are ultimately constrained by thermal considerations. In the disclosed LVF device, the temperature remains below 40° C. at a voltage of 700 V, enabling an assay time of 7 min. Further improvement in assay time may be achieved by etching the channels into thermally conductive substrates such as silicon (which must then be coated with a dielectric to prevent current leakage). Active cooling (e.g. by Peltier elements) may also be used, but results in a more complex system with a high energy consumption.

It has been shown that the, due to an increase in diffusivity with temperature, the length of the ITP interface is proportional to the ratio of the temperature to the electric field strength. Given the quadratic dependence of temperature on the applied voltage, one would therefore expect the width of the ITP interface to increase with increasing electric field strength. This was not observed in the present experiments, possibly due to the fact that the aforementioned proportionality does not account for changes in mobility, dissociation constants and viscosity with temperature. As such, although diffusion is not a limiting factor when increasing the voltage in the LVF chips, it does play a role in broadening the ITP zone, and a higher maximum concentration may be achieved by actively or passively cooling the ITP system.

Using the LVF chip, a 310,000-fold focusing was achieved, enabling direct detection of 10 fM DNA, a 100-fold improvement over standard glass microchannels. Importantly, in all experiments, standard buffers that are compatible with biological assays were used. In hybridization experiments, the strong focusing in the LVF chip accelerates the hybridization reaction, enabling a 1 pM limit of detection for unlabelled DNA (compared to 100 pM for the standard microchannel), despite the short (~10 s) reaction time at high concentrations. Multiplexed detection may be implemented by e.g. splitting the ITP interface to perform multiple assays in parallel, or by performing serial surface-based reactions on an array patterned on the wall of the channel. Improved performance is expected with surface-based assays. Based on the results of Karsenty et al. Anal. Chem. 86, 3028-3036 (2014), Han et al. Lab. Chip 14, 2958 (2014) and Paratore et al. Anal. Chem. (2017), a 10,000-fold lower limit of detection in LVF-based surface assays is expected as compared to standard flow assays.

Finally, as a demonstration of the requirement of large-volume focusing for detecting discrete targets, labelled bacteria were focused, and detection of 100 cfu/mL was demonstrated. Although in the experiments detailed herein the analyte was diluted in the TE, LVF devices are also compatible for focusing analytes present in the LE, which may be relevant to direct analysis (without e.g. filtration) of samples containing a high salt concentration. Detection of bacteria at concentrations of 100 cfu/mL is relevant for a range of infectious diseases (such as urinary tract infections (UTI)) and would not be possible using standard microfluidic chips. This demonstration of the capability to detect large, 'discrete' targets, as well as solute targets at low concentrations, is a step towards bridging the remaining gap in making on-chip ITP assays relevant for a range of clinical applications.

While the present invention has been particularly described, persons skilled in the art will appreciate that many variations and modifications can be made. Therefore, the invention is not to be construed as restricted to the particularly described embodiments, and the scope and concept of the invention will be more readily understood by reference to the claims, which follow.

The invention claimed is:

1. An isotachophoresis (ITP) apparatus comprising:
   (a) a flow channel comprising:
      (i) a first wide cross-sectional region comprising an absolute volume of at least 10 ul, and
      (ii) a second narrow cross-sectional region in fluid communication to said first wide cross-sectional region having a width and a height in the range of 1-100 µm,
   wherein the cross-sectional area ratio between the first wide cross-sectional and the second narrow cross-sectional regions is at least 10:1,
   wherein the first wide cross-sectional region comprises an array of inert structures so as to reduce sample dispersion by at least 1.5 fold in said first wide cross-sectional region compared to the second narrow cross-sectional region, and
   (b) a first zone and a second zone, said first zone is configured to contain a solution of high effective mobility leading electrolyte (LE) ion, and said second zone is configured to contain a solution of low effective mobility trailing electrolyte (TE) ion.

2. The apparatus of claim 1, wherein the first wide cross-sectional region comprises a converging cross-sectional region in fluid continuation between the first wide cross-sectional and the second narrow cross-sectional region.

3. The apparatus of claim 2, wherein said converging cross-sectional region has an angle of 10-70 degrees.

4. The apparatus of claim 1, wherein said array of inert structures is a plurality of pillars having a diameter in the range of 5-200 µm.

5. The apparatus of claim 4, wherein said plurality of pillars is characterized by any one of: (i) pillar arrays having a center-to-center distance of 10-800 µm; (ii) a ratio of at least 1:2 between the pillar diameter to pillar center-to-center.

6. The apparatus of claim 5, wherein the center-to-center distance of each pillar of the pillar array within the converging cross-sectional region is from 0 down to 5 fold lower than that of the non-converging cross-sectional region of said first wide cross-sectional region.

7. The apparatus of claim 1, wherein said array of inert structure within the first wide cross-sectional region form a plurality of flow channels.

8. The apparatus of claim 1, wherein at least a portion of the first wide cross-sectional region has a uniform depth.

9. The apparatus of claim 1, wherein at least a portion of the first wide cross-sectional region has converging depth, said depth ratio between the first and second cross-sectional regions is in the range of 1000:1.1.

10. The apparatus of claim 1, wherein at least a portion of the first wide cross-sectional region has a depth ranging from 10 mm to 100 µm and the second narrow cross-sectional region has a depth ranging from 100 µm to 10 µm.

11. The apparatus of claim 1, wherein the second narrow cross-section region comprises:
   (i) a first narrow cross-sectional subzone,
   (ii) a second wide cross-sectional subzone, and
   (iii) a third narrow cross-sectional subzone,
      at a ratio of 10:1-5:1 between the width of both the first narrow cross-sectional subzone and the third narrow wide cross-sectional subzones and the width of the second wide cross-sectional subzone.

12. The apparatus of claim 11, wherein any one of: (i) at least a portion of the second wide cross-sectional subzone comprises an array of inert structures; and (ii) said array of inert structures is a plurality of pillars having a diameter in the range of 20-100 µm.

13. The apparatus of claim 12, wherein the center-to-center distance of each pillar of the pillar array within said second wide cross-sectional subzone is from 0 up to 5 fold higher than that of said converging cross-sectional region.

14. The apparatus of claim 1, further comprising a cooling channel in parallel and/or proximity to at least a portion of the second narrow cross-sectional region.

15. The apparatus of claim 1, wherein said flow channel is configured to be operably connected to at least one anode and at least one cathode.

16. An ITP method, comprising the steps of:
(a) providing the ITP apparatus of claim 1;
(b) providing a sample to the flow channel of said ITP apparatus; and
(c) applying an electric field across said first zone and said second zone.

17. The method of claim 16, for focusing analytes from large sample volumes, optionally wherein said method is characterized by ITP focusing of target analytes from initial sample volumes of 80-10 µL into a concentrated zone with a volume of 800-300 pL (picoliter).

18. The method of claim 16, having at least 100-fold enhancement in any one of signal and limit of detection compared to a control microchannel.

19. A kit comprising:
(i) the ITP apparatus of claim 1;
(ii) a solution of high effective mobility leading electrolyte (LE) ion; and
(iii) a solution of low effective mobility trailing electrolyte (TE) ion.

* * * * *